US010785407B2

(12) United States Patent
Lertsumruaypun et al.

(10) Patent No.: US 10,785,407 B2
(45) Date of Patent: Sep. 22, 2020

(54) INFORMATION PROCESSING METHOD, INFORMATION PROCESSING DEVICE, AND COMPUTER-READABLE NON-TRANSITORY STORAGE MEDIUM STORING PROGRAM

(71) Applicant: Mercari, Inc., Minato-ku (JP)

(72) Inventors: Kanwipa Lertsumruaypun, Minato-ku (JP); Hiroaki Arisada, Minato-ku (JP)

(73) Assignee: Mercari, Inc., Tokyo (JP)

( * ) Notice: Subject to any disclaimer, the term of this patent is extended or adjusted under 35 U.S.C. 154(b) by 0 days.

(21) Appl. No.: 16/527,166

(22) Filed: Jul. 31, 2019

(65) Prior Publication Data

US 2020/0045226 A1 Feb. 6, 2020

(30) Foreign Application Priority Data

Jul. 31, 2018 (JP) ................................ 2018-143650

(51) Int. Cl.

*H04N 5/232* (2006.01)
*G06K 9/00* (2006.01)
*G06F 21/32* (2013.01)
*H04L 29/06* (2006.01)

(52) U.S. Cl.

CPC ......... *H04N 5/23222* (2013.01); *G06F 21/32* (2013.01); *G06K 9/00288* (2013.01); *G06K 9/00906* (2013.01); *G06K 9/00912* (2013.01); *H04N 5/232945* (2018.08); *H04L 67/42* (2013.01)

(58) Field of Classification Search

CPC ............................ H04N 5/23222; G06F 21/31
USPC .......................... 348/333.01, 333.02, 333.04
See application file for complete search history.

(56) References Cited

U.S. PATENT DOCUMENTS

2013/0124414 A1* 5/2013 Roach .................... G06Q 20/10 705/44
2014/0118519 A1* 5/2014 Sahin ................ G06K 9/00912 348/77
2015/0181111 A1* 6/2015 Stewart ............. H04N 5/23222 348/211.8
2015/0277573 A1* 10/2015 Kang ...................... G06F 3/017 345/156
2016/0227109 A1* 8/2016 Mattes ............... G06Q 20/4014
2018/0152629 A1* 5/2018 Ekpenyong ............ G06T 3/403
2019/0050546 A1* 2/2019 Hochrieser ............ G06F 21/32
(Continued)

FOREIGN PATENT DOCUMENTS

JP 2016/157439 A 9/2016

*Primary Examiner* — Anthony J Daniels
(74) *Attorney, Agent, or Firm* — Sterne, Kessler, Goldstein & Fox P.L.L.C.

(57) ABSTRACT

Provided is a technique capable of guaranteeing that an image submitted online during identity verification is an image photographed on the site. An information processing method executed by an information processing device including a display unit includes displaying, on the display unit, an image of a photographing region output by a photographing device, displaying, in the photographing region displayed on the display unit, a photographing guide indicating a position of an identity verification document in the photographing region and a holding method of the identity verification document, the photographing guide being selected based on a predetermined selection logic, and causing the photographing device to photograph the image of the photographing region.

11 Claims, 15 Drawing Sheets

(56) References Cited

U.S. PATENT DOCUMENTS

| | | | | |
|---|---|---|---|---|
| 2019/0141237 | A1* | 5/2019 | Kishimoto ................ | G06T 7/13 |
| 2019/0205634 | A1* | 7/2019 | Mayer .................. | G06Q 50/265 |
| 2019/0205635 | A1* | 7/2019 | Brown ............... | G06K 9/00463 |

* cited by examiner

INFORMATION PROCESSING METHOD, INFORMATION PROCESSING DEVICE, AND COMPUTER-READABLE NON-TRANSITORY STORAGE MEDIUM STORING PROGRAM

CROSS REFERENCE TO RELATED APPLICATION

This application is based upon and claims priority from Japanese Patent Application No. 2018-143650 filed in Japan on Jul. 31, 2018, the entire contents of which are incorporated herein by reference.

BACKGROUND OF THE INVENTION

Field of the Invention

The present disclosure relates to an information processing method, an information processing device, and a computer-readable non-transitory storage medium storing a program.

Description of the Related Art

In recent years, a financial service using ICT called Fintech has been developing. Examples of the Fintech service include a service for automatically creating household account books, account books, and the like to perform asset management of family budgets and companies, a service for performing asset management, a service for performing transaction of virtual currencies, and a service for providing settlement means by QR codes and the like.

Providers that provide these services are obliged to perform identity verification of people desiring to use the services in order to prevent illegal acts and the like from being performed. For example, Japanese Patent Application Laid-Open Publication No. 2016-157439 (Patent Literature 1) discloses a technique for facilitating identity verification of an applicant by displaying a plurality of identification cards on a screen in association with one another.

Under current situations, in a part of services for treating exchange of funds such as settlement, identify verification is strictly performed by not only confirming an image of an identification card provided online from a user but also using means such as mailing an application form to the home of the user. However, when future development of the services is considered, it is desirable to make it possible to complete the identity verification online without relying on the means such as the mailing.

When the identify verification is performed online, illegal image data subjected to processing or the like is likely to be submitted. In order to prevent such an illegal act, a mechanism for making it possible to guarantee that image data submitted online is not a reused image but an image on the site (live nature) is considered to be necessary.

However, although Patent Literature 1 discloses the technique for facilitating identity verification of an applicant, Patent Literature 1 does not describe a technique for guaranteeing that an image used for the identity verification is an image photographed on the site.

SUMMARY OF THE INVENTION

An object of the present disclosure is to provide a technique capable of guaranteeing that an image submitted online during identity verification is an image photographed on the site.

An information processing method according to an embodiment of the present disclosure is an information processing method executed by a processor of an information processing device including a display device, the information processing method including: displaying, on the display device, an image of a photographing region output by a photographing device; displaying, in the photographing region displayed on the display device, a photographing guide indicating a position of an identity verification document in the photographing region and a holding method of the identity verification document, the photographing guide being selected based on a predetermined selection logic; and causing the photographing device to photograph the image of the photographing region.

An information processing method according to an embodiment of the present disclosure is an information processing method executed by a processor of an information processing device including a display device, the information processing method including: displaying, on the display device, an image of a photographing region output by a photographing device; displaying, in the photographing region displayed on the display device, a photographing guide indicating a photographing method of a face of a user including a position of the face in the photographing region, the photographing guide being selected based on a predetermined selection logic; and causing the photographing device to photograph the image of the photographing region.

An information processing method according to an embodiment of the present disclosure is an information processing method executed by a processor of an information processing device including a display device, the information processing method including: displaying, on the display device, an image of a photographing region output by a photographing device; displaying, according to information indicating a position and a tilt in the photographing region determined based on a predetermined logic, on the image of the photographing region, a photographing guide indicating a photographing method of a side surface of an identity verification document; and causing the photographing device to photograph the image of the photographing region.

An information processing method according to an embodiment of the present disclosure is an information processing method executed by a processor of a second information processing device that communicates with a first information processing device, the information processing method including: a receiving step for receiving, from the first information processing device, position information of the first information processing device and an identity verification image of a user added with position information during photographing; and an authenticating step for approving the identity verification image as at least a part of identity verification for the user when the position information of the first information processing device and the position information added to the identity verification image of the user are within a predetermined range.

An information processing method according to an embodiment of the present disclosure is an information processing method executed by a processor of a second information processing device that communicates with a first information processing device, the information processing method including: a receiving step for receiving, from the first information processing device, an identity verification image of a user added with time information during photographing; and an authenticating step of approving the identity verification image as at least a part of identity verification for the user when time when the identity verification image is received and the time information added to the identity verification image of the user are within a predetermined range.

DETAILED DESCRIPTION OF THE PREFERRED EMBODIMENTS

<Compliance>

Disclosure described in this specification is, when being implemented, implemented while observing laws of countries where the present disclosure is implemented. The disclosure described in this specification is implemented with all changes, substitutions, modifications, alternations, and corrections that are necessary for observing the laws of the countries and those skilled in the art could make.

A form for implementing a communication system 1 according to the present disclosure is explained with reference to the drawings.

<System Configuration>

Figure 1:
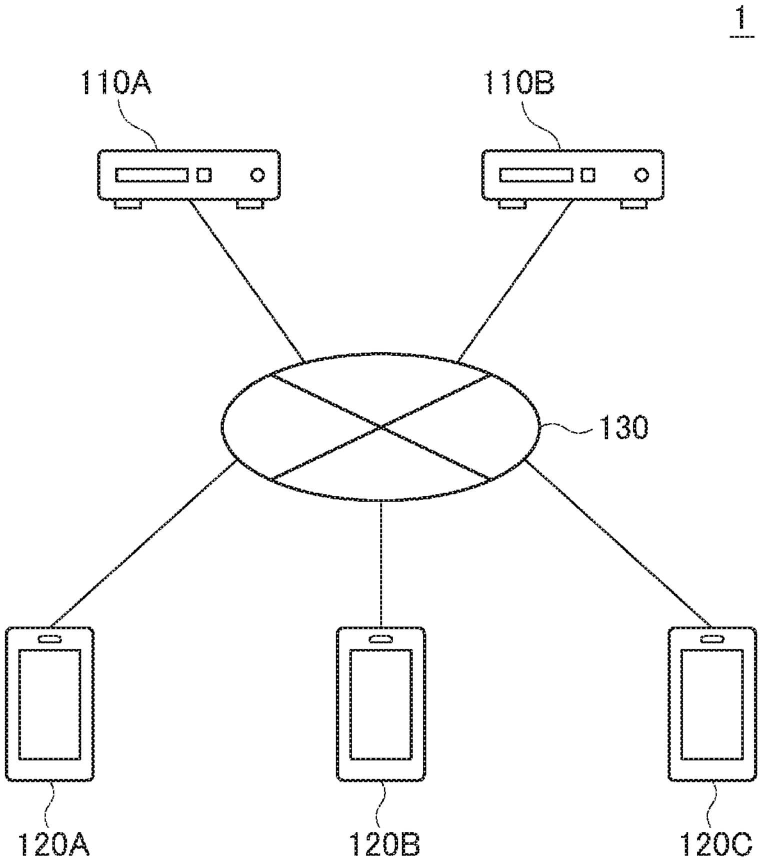
FIG. 1 shows the configuration of a communication system according to a form of an embodiment.

FIG. 1 shows the configuration of the communication system 1 according to an embodiment of the present disclosure. As disclosed in FIG. 1, in the communication system 1, a server 110A, a server 110B, a terminal 120A, a terminal 120B, and a terminal 120C are connected via a network 130.

In this disclosure, when it is unnecessary to distinguish the server 110A and the server 110B from each other, the server 110A and the server 110B may be respectively represented as servers 110.

In the present disclosure, when it is unnecessary to distinguish the terminal 120A, the terminal 120B, and the terminal 120C from one another, the terminal 120A, the terminal 120B, and the terminal 120C may be respectively represented as terminals 120.

In the present disclosure, when it is unnecessary to distinguish the servers 110 and the terminals 120 from each other, the servers 110 and the terminals 120 may be respectively represented as information processing devices 200. Note that, the numbers of the information processing devices 200 connected to the network 130 is not limited.

The servers 110 provide a predetermined service to the terminals 120 used by users via the network 130. The predetermined service includes, not as limitations but as examples, a settlement service, an electronic commerce service, an SNS (Social Networking Service) represented by an instant messenger, a content providing service for music, moving images, books, and the like, and a financial service. When the users use the predetermined service via the terminals 120, the servers 110 can provide the predetermined service to one or more terminals 120.

According to necessity, a terminal used by a user X is represented as a terminal 120X and user information in the predetermined service associated with the user X or the terminal 120X is represented as user information X. Note that the user information is information concerning a user associated with an account used by the user in the predetermined service. The user information includes, not as limitations but as examples, information associated with the user such as a name of the user, an icon image of the user, age of the user, sex of the user, an address of the user, preference of the user, and an identifier of the user input by the user or given by the predetermined service. The user information may be one of these kinds of information or may be a combination of these kinds of information.

The network 130 plays a role of connecting two or more information processing devices 200. The network 130 means a communication network that provides a connection path to enable the terminals 120 to transmit and receive data after being connected to the servers 110.

One or a plurality of portions of the network 130 may be a wired network or a wireless network. The network 130 includes, not as limitations but as examples, an ad hoc network, an intranet, an extranet, a virtual private network (VPN), a local area network (LAN), a wireless LAN (WLAN), a wide area network (WAN), a wireless WAN (WWAN), a metropolitan area network (MAN), a part of the Internet, a part of a public switched telephone network (PSTN), a cellular phone network, ISDNs (Integrated Service Digital Networks), wireless LANs, an LTE (Long Term Evolution), a CDMA (Code Division Multiple Access), a Bluetooth (registered trademark), and satellite communication or a combination of two or more of these networks. The network 130 can include one or a plurality of networks 130.

The information processing device 200 may be any information processing device if the information processing device can realize functions and/or methods described in this disclosure.

The information processing device 200 includes, not as limitations but as examples, a smartphone, a cellular phone (a feature phone), a computer (including, not as limitations but as examples, a desktop computer, a laptop computer, and a tablet computer), a server device, a media computer platform (including, not as limitations but as examples, a cable, a satellite set-top box, and a digital video recorder), a hand-held computer device (including, not as limitations but as examples, a PDA (Personal Digital Assistant) and an electronic mail client), a wearable terminal (including, not as limitations but as examples, an eyeglass-type device and a watch-type device), other kinds of computers, or a communication platform.

<Hardware (HW) Configuration>

Figure 2:
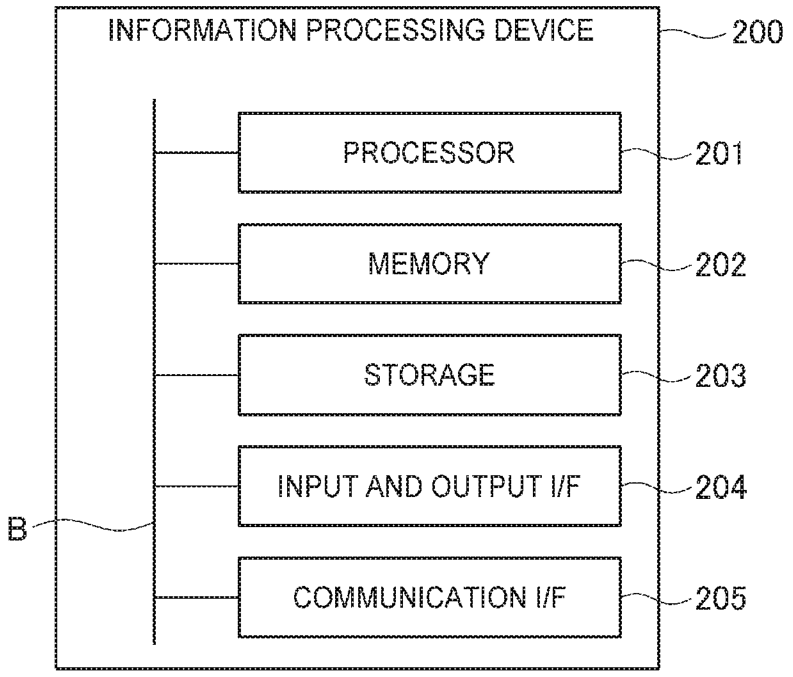
FIG. 2 shows an example of a hardware configuration of an information processing device according to the present disclosure.

A HW configuration of the information processing device 200 included in the communication system 1 is explained with reference to FIG. 2.

The information processing device 200 includes a processor 201, a memory 202, a storage 203, an input and output interface (input and output I/F) 204, and a communication interface (communication I/F) 205. The components of HW of the information processing device 200 is, not as a limitation but as an example, connected to one another via a bus B.

The information processing device 200 realizes functions and/or methods described in the present disclosure according to cooperation of the processor 201, the memory 202, the storage 203, the input and output I/F 204, and the communication I/F 205.

The processor 201 executes functions and/or methods realized by codes or commands included in programs stored in the storage 203. The processor 201 includes, not as limitations but as examples, a central processing unit (CPU), an MPU (Micro Processing Unit), a GPU (Graphics Processing Unit), a microprocessor, a processor core, a multiprocessor, an ASIC (Application-Specific Integrated Circuit), and an FPGA (Field Programmable Gate Array). The processor 201 may realize respective kinds of processing disclosed in embodiments with a logic circuit (hardware) and a dedicated circuit formed in an integrated circuit (IC) chip, an LSI (Large Scale Integration), or the like. These circuits may be realized by one or a plurality of integrated circuits. A plurality of kinds of processing explained in the embodiments may be realized by one integrated circuit. The LSI is sometimes called VLSI, super LSI, ultra LSI, and the like according to differences in an integration degree.

The memory 202 temporarily stores a program loaded from the storage 203 and provides a work area to the processor 201. The memory 202 also temporarily stores various data generated while the processor 201 is executing the program. The memory 202 includes, not as limitations but as examples, a RAM (Random Access Memory) and a ROM (Read Only Memory).

The storage 203 stores programs. The storage 203 includes, not as limitations but as examples, a HDD (Hard Disk Drive), an SSD (Solid State Drive), and a flash memory.

The communication I/F 205 performs transmission and reception of various data via the network 130. Communication by the communication I/F 205 may be executed either by wire or by radio. Any communication protocol may be used if the communication can be executed. The communication I/F 205 has a function of executing communication with other information processing devices via the network 130. The communication I/f 205 transmits various data to the other information processing devices according to an instruction from the processor 201. The communication I/F 205 receives various data transmitted from the other information processing devices and transmits the various data to the processor 201.

The input and output I/F 204 includes an input device for inputting various kinds of operation for the information processing device 200 and an output device for outputting a processing result of processing in the information processing device 200. In the input and output I/F 204, the input device and the output device may be integrated. The input and output I/F 204 may be separated into the input device and the output device.

The input device is realized by any one of all kinds of devices that can receive an input from the user and transmit information related to the input to the processor 201 or a combination of the devices. The input device includes, not as limitations but as examples, a touch panel, a touch display, a hardware key such as a keyboard, a pointing device such as a mouse, a camera (an operation input via an image), and a microphone (an operation input by voice).

The output device is realized by any one of all kinds of devices that can output a processing result of processing in the processor 201 or a combination of the devices. When the processing result is output as a video and/or a moving image, the output device can be realized by any one of all kinds of devices that can display, according to display data written in a frame buffer, the display data or a combination of the devices. The output device includes, not as limitations but as examples, a touch panel, a touch display, a monitor (including, not as limitations but as examples, a liquid crystal display and an OELD (Organic Electroluminescence Display)), a head mounted display (HMD), projection mapping, a hologram, a device capable of displaying an image, text information, and the like in the air and the like (which may be a vacuum), a speaker (a sound output), and a printer. Note that these output devices may be capable of three-dimensionally displaying display data.

Programs in the embodiments of the present disclosure may be provided in a state in which the programs are stored in a computer-readable storage medium. The storage medium is capable of storing the programs in a "non-transitory tangible medium". The programs include, not as limitations but as examples, a software program and a computer program.

In an appropriate case, the storage medium can include an integrated circuit based on one or a plurality of semiconductors or other integrated circuits (ICs) (including, not as limitations but as examples, a field programmable gate array (FPGA) and an application specific integrated circuit (ASIC)), a hard disk drive (HDD), a hybrid hard drive (HHD), an optical disk, an optical disk drive (ODD), a magneto-optical disk, a magneto-optical drive, a floppy diskette, a floppy disk drive (FDD), a magnetic tape, a solid-state drive (SSD), a RAM drive, a secure digital card or drive, or any other appropriate storage medium or an appropriate combination of two or more of these media. In an appropriate case, the storage media may be a volatile storage medium, a nonvolatile storage medium, or a combination of the volatile and nonvolatile storage media.

The program of the present disclosure may be provided to the information processing device 200 via any transmission medium (a communication network, a broadcasting wave, etc.) capable of transmitting the program.

The embodiments of the present disclosure can also be realized in a form of a data signal obtained by embodying the program with electronic transmission and embedded in a carrier wave.

Note that the program of the present disclosure is implemented using, not as limitations but as examples, a script language such as Action Script or Java Script (registered trademark), an object-oriented programming language such as Objective-C or Java (registered trademark), a markup language such as HTML5, and the like.

At least a part of processing in the information processing device 200 may be realized by cloud computing configured by one or more computers.

At least a part of the processing in the information processing device 200 may be performed by the other information processing devices. In this case, at least a part of processing of the functional units realized by the processor 201 may be performed by the other information processing devices.

<Others>

Unless explicitly referred to, the configuration of determination in the embodiments of the present disclosure is not essential. Predetermined processing may be performed when a determination condition is satisfied or the predetermined processing may be performed when the determination condition is not satisfied.

In the present disclosure, unless clearly described or unless indicated by a context, "or" is not an exclusive means and is an inclusive means. Therefore, in the present disclosure, unless clearly described or unless indicated by a context, "A or B" means "A, B, or both of A and B". Further, unless clearly described or unless indicated by a context, "and" has meanings of both of joint and several. Therefore, in this specification, unless clearly described or unless indicated by a context, "A and B" means "A and B jointly or severally". Further, unless clearly described or unless indicated by a context, "a", "an", or "the" means "one or a plurality of". Therefore, in this specification, unless clearly described otherwise or unless indicated by a context, "an A" or "the A" means "one or a plurality of As".

The present disclosure includes all changes, substitutions, modifications, alterations, and corrections that those skilled in the art could make for the embodiments and/or examples of the present disclosure. Similarly, in an appropriate case, the appended claims include all changes substitutions, modifications, alterations, and corrections that those skilled in the art could make for the embodiments and/or the examples of the present disclosure. Further, the present disclosure includes any combinations of one or a plurality of characteristics of the embodiments and/or the examples in the present disclosure and one or a plurality of characteristics of other embodiments and/or examples in the present disclosure that those skilled in the art could make.

In addition, reference in the appended claims to a device or a system or components of the device or the system that are adapted, are disposed, have abilities, are configured, are usable, are operable, or can operate to implement specific functions includes the device, the system, and the components irrespective of whether the device, the system, the components, or the specific functions thereof are activated, turned on, or unlocked as long as the device, the system, or the components are adapted, are disposed, have abilities, are configured, are enabled to be used, are enabled to be operated, or can operate in that way.

First Embodiment

A first embodiment is an embodiment in which, when identity verification processing of a user is performed using images of an identification card (an identity verification document) and an image of a face of the user, a photographing method of the images of the identification card is instructed on the site to guarantee that an image uploaded online is photographed on the site (live nature).

In the first embodiment, in a predetermined service provided by the server 110, when identity verification and confirmation of live nature is performed online at timing such as time of an application to use of the service and identity is authenticated, the use of the predetermined service is permitted. When receiving, for example, an application to use the service, the server 110 requests the user to submit, online, an image obtained by photographing the identification card of the user and an image obtained by photographing the face of the user. The user receives the request and photographs the identification card and the face of the user using a camera included in the terminal 120. The terminal 120 transmits photographed images to the server 110. The server 110 analyzes the received images to perform identity verification and confirmation of live nature.

At this time, the terminal 120 displays, on a screen on which the photographing of the identification card is performed, a photographing guide indicating a photographing method of the identification card (hereinafter referred to as "identification card photographing guide"). The identification card photographing method includes a position of the identification card in a frame of a photographed image and a holding method of the identification card. The identification card photographing guide is changed every time the user photographs an image of the identification card. Note that a specific example of the photographing guide is explained below. The photographing guide may be defined as indicating a positional relation between the identification card and a part of the body of the user where the identification card is held.

The server 110 confirms, with image processing, whether the image of the identification card submitted online is an image photographed according to the instructed photographing guide to discriminate whether the photographed image is an image photographed on the site. When the photographed image is the image photographed according to the instructed photographing guide, it is guaranteed that the image is an image photographed on the site.

The identification card used for the identity verification processing only has to be a medium with which identity can be confirmed. The identification card includes, not as limitations but as examples, a driver's license, a passport, a basic resident register card, an identity number card, and a health insurance card. The identification card is not limited to public certificates.

According to the first embodiment, the identification card photographing guide is changed every time the user photographs an image of the identification card. That is, it is difficult for the user to perform an act of photographing, beforehand, an image to be submitted online and submitting the image later and an act of processing and submitting an image photographed beforehand. That is, according to the first embodiment, there is an effect that it is possible to guarantee that an image submitted online is an image photographed on the site (live nature). Since the server 110 or the terminal 120 performs selection of the identification card photographing guide instructed to the user, it is possible to guarantee randomness of a photographing guide instructed to the user. There is an effect that it is possible to improve confirmation accuracy in performing identity verification and live nature confirmation.

According to the first embodiment, since the images of the identification card and the image of the face are separate images, it is possible to avoid a problem in that it is difficult to focus on both of the identification card and the face in one image.

<Functional Configuration in the First Embodiment>

Figure 3:
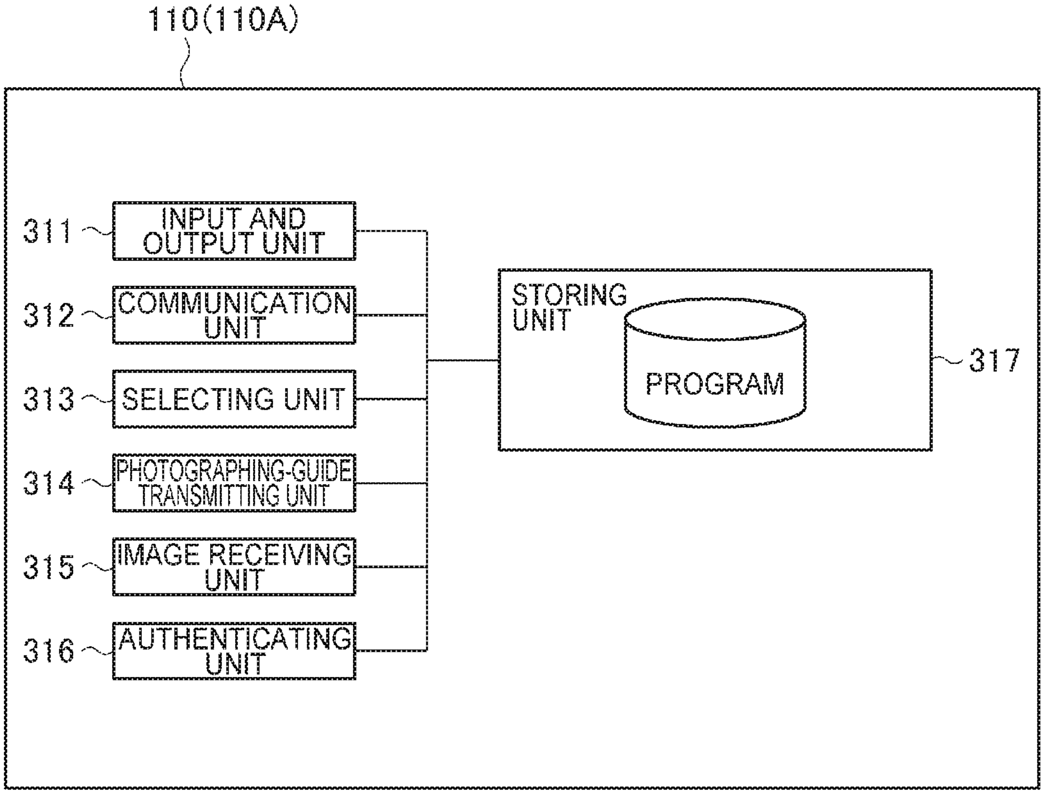
FIG. 3 shows an example of a block diagram showing a functional configuration of an information processing device according to a first embodiment.

A functional configuration of the server 110 is explained with reference to FIG. 3. Functional units disclosed in FIG. 3 are realized by cooperation of the processor 201, the memory 202, the storage 203, the input and output I/F 204, and the communication I/F 205 included in the information processing device 200.

The server 110 includes an input and output unit 311, a communication unit 312, a selecting unit 313, a photographing-guide transmitting unit 314, an image receiving unit 315, an authenticating unit 316, and a storing unit 317. The input and output unit 311, the communication unit 312, the selecting unit 313, the photographing-guide transmitting unit 314, the image receiving unit 315, and the authenticating unit 316 are realized by the processor 201 reading out and executing programs stored in the storing unit 317. The storing unit 317 is realized using the memory 202 and/or the storage 203.

The input and output unit 311 has a function of performing processing for receiving input of various data via the input and output I/F 204 and processing for outputting various data via the input and output I/F 204.

The communication unit 312 has a function of performing processing for receiving various data from the terminal 120 via the communication I/F 205 and processing for transmitting various data to the terminal 120 using the communication I/F 205.

The selecting unit 313 has a function of selecting, out of a plurality of variations (patterns), the identification card photographing guide that should be displayed on the screen of the terminal 120.

The photographing-guide transmitting unit 314 has a function of transmitting, to the terminal 120, information for instructing the identification card photographing guide, which is selected by the selecting unit 313 and should be displayed on the screen of the terminal 120, to the terminal 120 (hereinafter referred to as "photographing guide instruction information").

The image receiving unit 315 has a function of receiving, from the terminal 120, the images of the identification card of the user and the image of the face of the user photographed by the terminal 120 and attribute information (a name, an address, a date of birth, etc.) of the user input by the user on the screen of the terminal 120.

The authenticating unit 316 has a function of performing identity verification for the user and live nature confirmation using the images of the identification card of the user, the image of the face of the user, and the attribute information of the user received by the image receiving unit 315. Note that, in the following explanation, the identity verification for the user and the live nature confirmation are sometimes collectively referred to as "identity authentication".

More specifically, the authenticating unit 316 performs the identity verification for the user and the live nature confirmation based on:

1. a result obtained by comparing the position of the identification card and the holding method of the identification card indicated by the identification card photographing guide and a position of the identification card and a holding method of the identification card photographed in the images of the identification card of the user received by the image receiving unit 315;

2. a result obtained by comparing an image of a face portion included in the images of the identification card of the user received by the image receiving unit 315 and the received image of the face of the user; and 3. a result obtained by comparing attribute information of the user included in the images of the identification card of the user received by the image receiving unit 315 and the received attribute information of the user.

Note that the authenticating unit 316 may acquire results of identity verification and live nature confirmation performed by an administrator or the like of the server 110 rather than performing the identity verification and the live nature confirmation of the user.

The storing unit 317 stores the programs executed by the server 110 according to the first embodiment.

Figure 4:
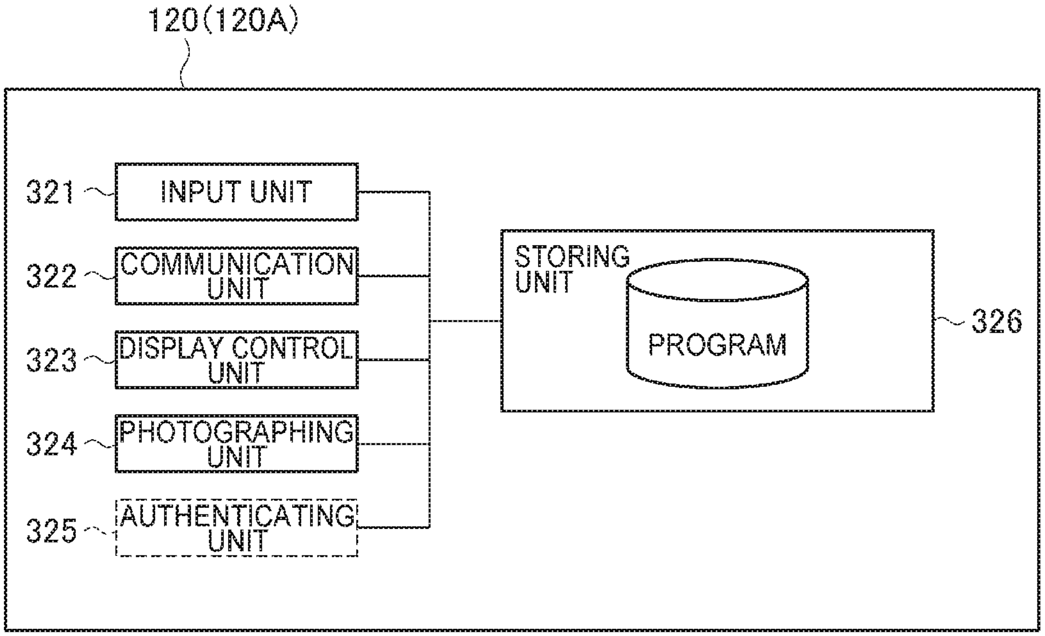
FIG. 4 shows an example of a block diagram showing a functional configuration of an information processing device according to the first embodiment.

A functional configuration of the terminal 120 is explained with reference to FIG. 4. Functional units disclosed in FIG. 4 are realized by cooperation of the processor 201, the memory 202, the storage 203, the input and output I/F 204, and the communication I/F 205 included in the information processing device 200.

The terminal 120 includes an input unit 321, the communication unit 322, a display control unit 323, a photographing unit 324, an authenticating unit 325, and a storing unit 326. The input unit 321, the communication unit 322, the display control unit 323, the photographing unit 324, and the authenticating unit 325 are realized by the processor 201 reading out and executing computer programs stored in the storing unit 326. The storing unit 326 is realized using the memory 202 and/or the storage 203.

The input unit 321 has a function of performing processing for receiving various inputs via the input and output I/F 204. For example, the input 321 receives, for example, input of the attribute information of the user via the touch panel or the like included in the terminal 120.

The communication unit 322 has a function of performing processing for receiving various data from the server 110 via the communication I/F 205 and processing for transmitting various data to the server 110 using the communication I/F 205. The communication unit 322 has a function of receiving the photographing guide instruction information from the server 110. The communication unit 322 has a function of transmitting, to the server 110, images of the identification card of the user and an image of the face of the user photographed by the photographing unit 324 and the attribute information of the user received by the input unit 321.

The display control unit 323 has a function of displaying an image indicating a photographing region (which may be referred to as an image of the photographing region or a photographing screen) output from the camera (a photographing device) included in the terminal 120 and displaying, over the image indicating the photographing region, the identification card photographing guide instructed by the photographing guide instruction information from the server 110.

Note that, as specifically explained below, in the first embodiment, instead of the server 110, the terminal 120 itself may select the identification card photographing guide displayed on the screen of the terminal 120. In this case, the display control unit 323 may select the identification card photographing guide out of a plurality of variations (patterns) according to a predetermined selection logic.

The photographing unit 324 has a function of photographing, in response to operation by the user, images of the identification card of the user and an image of the face of the user using the camera included in the terminal 120.

The authenticating unit 325 has a function of performing the identity verification for the user and the live nature confirmation using the photographing guide instruction information, the images of the identification card of the user and the image of the face of the user photographed by the photographing unit 324, and the attribute information of the user input to the input unit 321. Note that, as specifically explained below, the authenticating unit 325 is a functional unit necessary when the terminal 120 itself performs the identity verification processing for the user and the live nature confirmation processing. Therefore, the authenticating unit 325 is unnecessary when the terminal 120 itself does not perform the identity verification processing for the user and the live nature confirmation processing.

The storing unit 326 stores computer programs executed by the terminal 120 according to the first embodiment. The storing unit 326 temporarily stores the photographing guide instruction information received from the server 110.

<Operation Processing in the First Embodiment>

Figure 5:
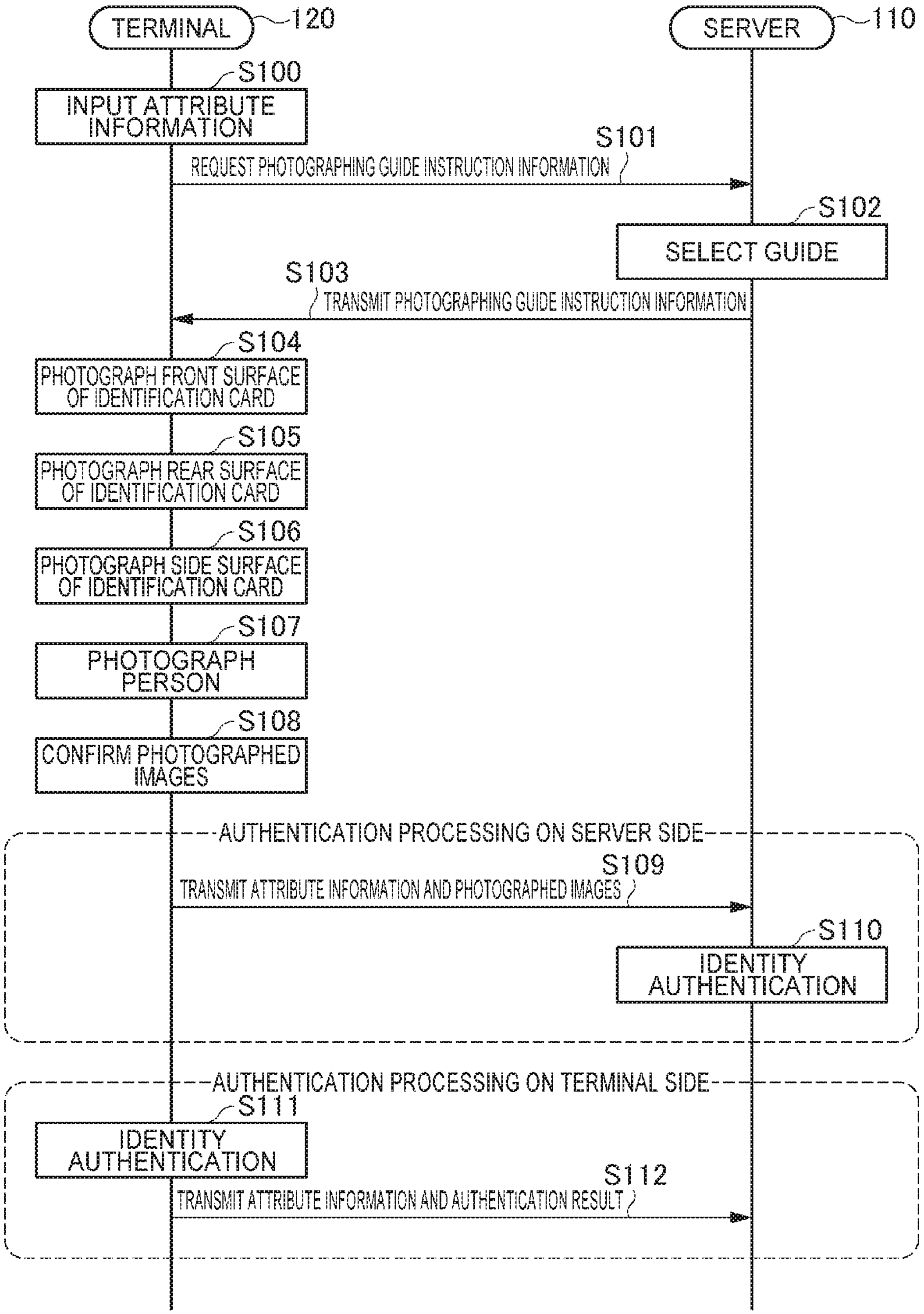
FIG. 5 shows an example of a sequence showing processing performed by a communication system according to the first embodiment.

Processing of the communication system 1 according to the first embodiment is explained with reference to FIG. 5. FIG. 5 shows an example of a sequence showing processing performed by the communication system 1 according to the first embodiment.

Images of an identification card to be photographed may be two kinds of images, that is, an image of a person photograph page of the identification card and an image of a side surface of the identification card. For example, it is possible to cope with an identification card in which a person photograph is shown on a specific page such as a passport. The images of the identification card to be photographed may be two kinds of images, that is, an image of the front surface of the identification card and an image of the side surface of the identification card. For example, it is possible to cope with an identification card in which information is described only on the front surface of the identification card. The images of the identification card to be photographed may be three kinds of images, that is, an image of the front surface of the identification card, an image of the rear surface of the identification card, and an image of the side surface of the identification card. For example, it is possible to cope with an identification card in which information is described on both of the front surface and the rear surface such as a driver's license or a basic resident register card.

The following explanation is based on the premise that the images of the identification card to be photographed are the three kinds of images, that is, the image of the front surface of the identification card, the image of the rear surface of the identification card, and the image of the side surface of the identification card. Similarly, it is assumed that the identification card photographing guide includes a photographing guide for the front surface of the identification card, a photographing guide for the rear surface of the identification card, and a photographing guide for the side surface of the identification card.

In step S100, the input unit 321 of the terminal 120 receives input of attribute information of the user such as a name, an address, and a date of birth of the user via, for example, the touch panel included in the terminal 120. Note that the input unit 321 may further receive input of physical characteristics (a dominant hand, the size of a hand, presence or absence of defects of hands and fingers, etc.) of the user.

In step S101, the display control unit 323 of the terminal 120 requests the server 110 to transmit the photographing guide instruction information. Note that, when receiving the input of the physical characteristic of the user in step S100, the display control unit 323 transmits the input physical characteristics of the user to the server 110 as well.

In step S102, the selecting unit 313 of the server 110 selects, out of a plurality of variations, according to a predetermined selection logic, photographing guides for the identification card (the front surface, the rear surface, and the side surface) instructed to the terminal 120. The selecting unit 313 may select, not as limitations but as examples, the photographing guides of identification card instructed to the terminal 120 respectively out of the plurality of variations at random or may select the photographing guides based on the present environment information (date, time, weather, position information of the terminal 120, etc.). For example, the photographing guides instructed to the terminal 120 may be decided in advance for each date (or each time, each weather, or each region). The selecting unit 313 may select, as the photographing guides instructed to the terminal 120, photographing guides corresponding to the present date (or the present time, the present weather, or the present region where the terminal 120 is present).

The selecting unit 313 may select, based on the physical characteristics of the user received from the terminal 120, the identification card photographing guide instructed to the terminal 120. For example, for a user having small size of a hand, the selecting unit 313 may select the photographing guides instructed to the terminal 120 out of photographing guides for using a palm. Alternatively, the selecting unit 313 may select the photographing guides instructed to the terminal 120 out of photographing guides for using a dominant hand of the user.

In step S103, the photographing-guide transmitting unit 314 of the server 110 transmits the photographing guide instruction information for instructing the identification card photographing guide selected in the processing procedure of step S102 to the terminal 120.

In step S104, the display control unit 323 of the terminal 120 displays, over a photographing screen that displays an output image of the camera, the photographing guide for the front surface of the identification card instructed from the server 110. The user adjusts the position of the camera such that the front surface of the identification card overlaps the photographing guide displayed on the photographing screen and holds the identification card as instructed in the photographing guide. The photographing unit 324 photographs an image of the front surface of the identification card at timing when the shutter button is depressed (or touched).

In step S105, the display control unit 323 of the terminal 120 displays, over the photographing screen that displays an output image of the camera, the photographing guide for the rear surface of the identification card instructed from the server 110. The user adjusts the position of the camera such that the rear surface of the identification card overlaps the photographing guide displayed on the photographing screen and holds the identification card as instructed in the photographing guide. The photographing unit 324 photographs an image of the rear surface of the identification card at the timing when the shutter button is depressed (or touched).

In step S106, the display control unit 323 of the terminal 120 displays, over the photographing screen that displays an output image of the camera, the photographing guide for the side surface of the identification card instructed from the server 110. The user adjusts the position of the camera such that the side surface of the identification card overlaps the photographing guide displayed on the photographing screen and holds the identification card as instructed in the photographing guide. The photographing unit 324 photographs an image of the side surface of the identification card at the timing when the shutter button is depressed (or touched).

In step S107, the photographing unit 324 photographs an image of the face of the user at the timing when the shutter button is depressed (or touched).

In step S108, the display control unit 323 of the terminal 120 displays, on the screen, the photographed images of the front surface, the rear surface, and the side surface of identification card and the photographed image of the face of the user and urges the user to confirm whether the images may be transmitted to the server 110. At this time, in order to enable the user to confirm whether the photographed images are photographed according to the photographing guide, the display control unit 323 may arrange the photographed images and the photographing guide side by side or display the photographing guide over the photographed images. When the user permits the transmission, the processing proceeds to a processing procedure of step S109. When the user desires photographing again, photographing of images desired by the user is performed again.

Note that execution order of the processing in S104 to S107 is not limited to the example explained above. The processing may be executed in any order. The processing in S108 may be executed every time the processing in S104 to S107 is respectively performed.

Processing procedures of steps S109 and S110 indicate processing procedures in which the identity verification processing and the live nature confirmation processing are implemented on the server 110 side. In step S109, the communication unit 322 transmits the attribute information of the user input in the processing procedure of step S100 and the images of the front surface, the rear surface, and the side surface of the identification card and the image of the face of the user to the server 110.

In step S110, the authenticating unit 316 of the server 110 performs the identity verification processing for the user and the live nature confirmation processing using the received attribute information of the user and the received images of the front surface, the rear surface, the side surface of the identification card and the received image of the face of the user.

First, the authenticating unit 316 compares the position of the identification card and the holding method of the identification card in the identification card photographing guide instructed to the terminal 120 and a position of the identification card and a holding method of the identification card photographed in the images of the identification card to confirm that the photographed images are photographed according to the photographing guide.

For example, the authenticating unit 316 may analyze the image of the front surface of the identification card (the same applies to the images of the rear surface and the side surface) to specify a position of the identification card on the entire screen. When deviation between the specified position and the position of the front surface of the identification card in the photographing guide is equal to or smaller than the predetermined threshold, the authenticating unit 316 may determine that the position of the image of the front surface of the identification card conforms to the photographing guide. The authenticating unit 316 may analyze the image of the front surface of the identification card to specify a shape of a hand holding the identification card photographed in the image. When deviation between the specified shape of the hand and the shape of the hand holding the identification card in the photographing guide is equal to or smaller than the predetermined threshold, the authenticating unit 316 may determine that the holding method of the identification card photographed in the image photographed by the user conforms to the photographing guide.

Subsequently, the authenticating unit 316 compares an image of a face portion included in the images of the identification card and the image of the face of the user and confirms that the respective images satisfy a predetermined coincidence determination standard to confirm that a person photographed in the identification card and the user are the same person. For example, the authenticating unit 316 may extract feature values of the face photographed in the respective images and, when a difference between the feature values is equal to or smaller than a predetermined value, determine that the person photographed in the identification card and the user are the same person.

Subsequently, the authenticating unit 316 compares attribute information of the user included in the images of the identification card and the attribute information of the user input to the terminal 120 by the user to confirm that the attribute information input by the user coincides with a described matter of the identification card.

For example, the authenticating unit 316 may read a character string photographed in the images of the identification card and, when the read character string and the attribute information of the user input by the user coincide, determine that the attribute information input by the user and the described matter of the identification card coincide. As an example, the authenticating unit 316 can determine whether a name, a date of birth, an address, and the like of the user described in the identification card and the attribute information of the user input by the user coincide.

When all of the items "the images of the identification card are photographed according to the photographing guide", "the person photographed in the identification card and the user are the same person", and "the attribute information input by the user coincides with the described matter of the identification card" are successfully confirmed, the authenticating unit 316 determines that the user is a service applicant himself or herself and the image is photographed on the site (has live nature).

On the other hand, when any one of the items is not successfully confirmed, the authenticating unit 316 may instruct the terminal 120 (the user) to perform the photographing again. The terminal 120 may transmit images of the identification card or an image of the face photographed again to the server 110. The authenticating unit 316 of the server 110 may perform the identity verification and the live nature confirmation again using the image received anew.

Alternatively, concerning the item not successfully confirmed, the authenticating unit 316 may leave determination to, for example, the administrator of the server 110.

Note that, when any one of the items cannot be confirmed and a time from a point in time when the authenticating unit 316 instructs the terminal 120 to perform the photographing again until the authenticating unit 316 receives the image from the terminal 120 again is equal to or larger than a predetermined threshold, the authenticating unit 316 may determine that the identity verification and the live nature confirmation are unsuccessful without performing the analysis by the image processing and stops the subsequent processing (e.g., processing such as a service start procedure). Visual confirmation of an image transmitted after the identity verification and the live nature confirmation are completed in step S110 is desirably performed by a person. The visual confirmation is desirably performed irrespective of failure and success of the identity verification and the live nature confirmation.

Processing procedures of steps S111 and S112 indicate a processing procedure in which the identity verification processing and the live nature confirmation processing are implemented on the terminal 120 side rather than the server 110. When the identity verification processing and the live nature confirmation processing are implemented on the server 110 side, the processing procedures of steps S111 and S112 are omitted. When the identity verification processing and the live nature confirmation processing are implemented on the terminal 120 side, the processing procedures of steps S109 and S110 are omitted.

The identity verification processing and the live nature confirmation processing performed by the authenticating unit 325 of the terminal 120 in step S111 are the same as the identity verification processing and the live nature confirmation processing performed by the authenticating unit 316 of the server 110 in the processing procedure of step S110. Therefore, explanation of the identity verification processing and the live nature confirmation processing is omitted.

In step S112, the communication unit 322 of the terminal 120 transmits the attribute information of the user input in the processing procedure of step S102 and results (success or failure) of the identity verification and the live nature confirmation to the server 110. Note that, when failing in the identity verification and the live nature confirmation, the communication unit 322 may not transmit the attribute information of the user to the server 110.

In the processing procedure explained with reference to FIG. 5 above, display data for displaying the identification card photographing guide on the screen of the terminal 120 may be stored in the storing unit 326 in the terminal 120 in advance in association with an identifier for uniquely identifying data of the photographing guide. In this case, the photographing-guide transmitting unit 314 of the server 110 may transmit the identifier of the photographing guide to the terminal 120 as the photographing guide instruction information. Alternatively, the display data for displaying the identification card photographing guide on the screen of the terminal 120 is stored in the storing unit 317 of the server 110. The photographing-guide transmitting unit 314 of the server 110 may transmit the display data itself of the photographing guide to the terminal 120 as the photographing guide instruction information. Since the identifier has a smaller data size than the display data, the former method can reduce a communication data amount in the server 110 and the terminal 120 compared with the latter method. On the other hand, compared with the former method, the latter method can perform the update of the display data on a real-time basis.

Figure 6:
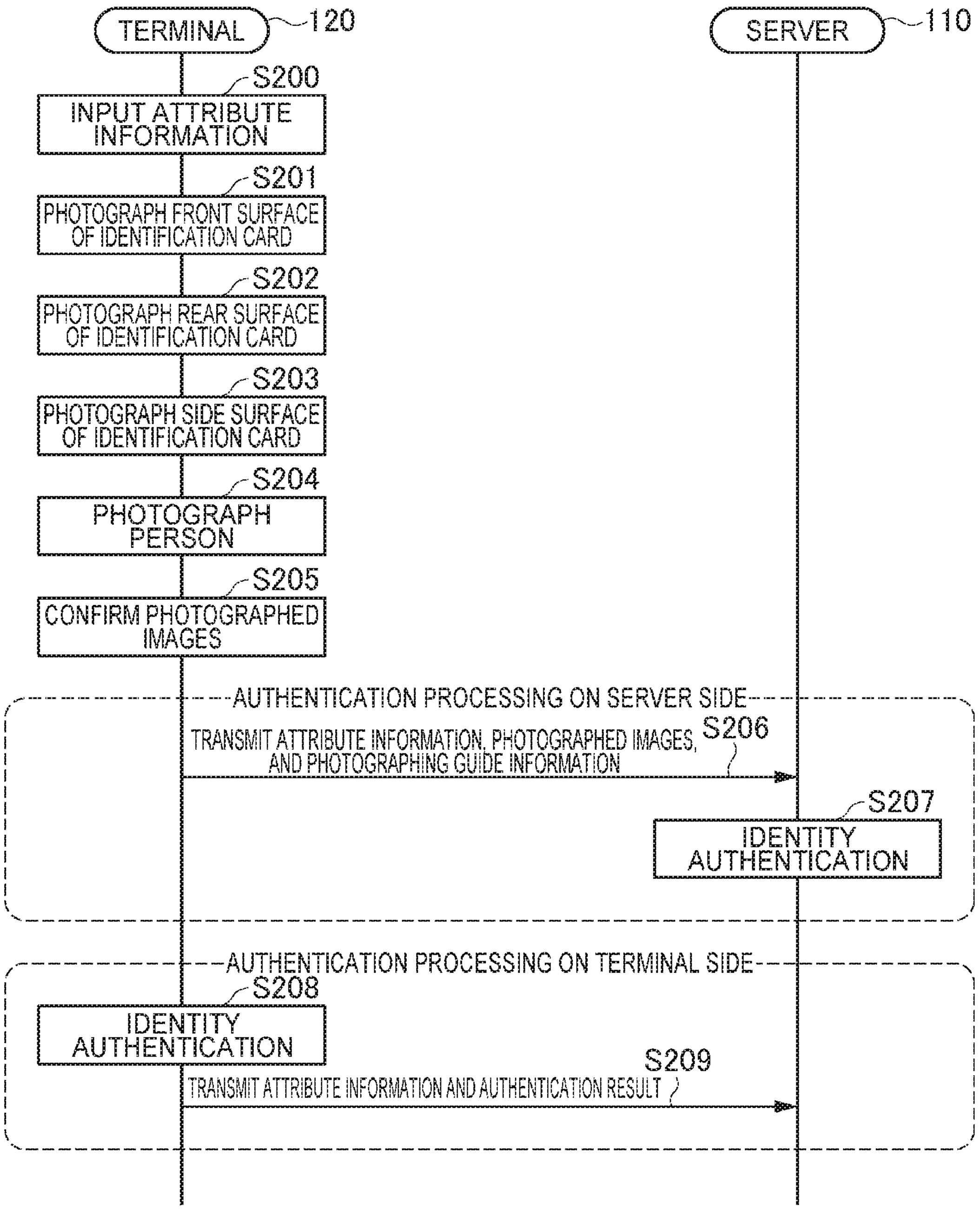
FIG. 6 shows an example of a sequence showing processing performed by the communication system according to the first embodiment.

FIG. 6 shows an example of a sequence showing processing of the communication system 1 according to the embodiment. A sequence example in which the terminal 120 itself determines the identification card photographing guide displayed on the screen of the terminal 120 is explained with reference to FIG. 6.

A processing procedure of step S200 is the same as the processing procedure of step S100 in FIG. 5. Therefore, explanation of the processing procedure is omitted.

In step S201, the display control unit 323 selects, out of a plurality of variations, a photographing guide for the identification card (the front surface) displayed on the photographing screen. A selection method may be the same as the method performed by the selecting unit 313 of the server 110 explained in step S102 in FIG. 5. Subsequently, the display control unit 323 displays the selected photographing guide for the front surface of the identification card over the photographing screen that displays an output image of the camera. The photographing unit 324 photographs an image of the front surface of the identification card at the timing when the shutter button is depressed (or touched).

In step S202, the display control unit 323 selects, out of a plurality of variations, a photographing guide for the identification card (the rear surface) displayed on the photographing screen. A selection method may be the same as the method performed by the selecting unit 313 of the server 110 explained in step S102 in FIG. 5. Subsequently, the display control unit 323 displays the selected photographing guide for the rear surface of the identification card over the photographing screen that displays an output image of the camera. The photographing unit 324 photographs an image of the rear surface of the identification card at the timing when the shutter button is depressed (or touched).

In step S203, the display control unit 323 selects, out of a plurality of variations, a photographing guide for the identification card (the side surface) displayed on the photographing screen. A selection method may be the same as the method performed by the selecting unit 313 of the server 110 explained in step S102 in FIG. 5. Subsequently, the display control unit 323 displays the selected photographing guide for the side surface of the identification card over the photographing screen that displays an output image of the camera. The photographing unit 324 photographs an image of the side surface of the identification card at the timing when the shutter button is depressed (or touched).

In step S204, the photographing unit 324 photographs an image of the face of the user at the timing when the shutter button is depressed (or touched).

A processing procedure of step S205 is the same as the processing procedure of S108 in FIG. 5. Therefore, explanation of the processing procedure is omitted.

Note that execution order of the processing in S201 to S205 is not limited to the example explained above and may be executed in any order. The processing in S205 may be executed every time the respective processing in S201 to S204 is performed.

In step S206, the communication unit 322 transmits, to the server 110, the attribute information of the user in the processing procedure of step S200, the images of the front surface, the rear surface, and the side surface of the identification card, the image of the face of the user, and the photographing guide information input. The photographing guide information includes information for specifying the photographing guides for the identification card (the front surface, the rear surface, and the side surface) selected by the terminal 120.

In step S207, the authenticating unit 316 of the server 110 performs the identity verification for the user and live nature confirmation processing using the received attribute information of the user, the received images of the front surface, the rear surface, and the side surface of the identification card, the received image of the face of the user, and the photographing guide information. The authenticating unit 316 of the server 110 recognizes, referring to the photographing guide information, according to which photographing guide the user performs the photographing. The other processing procedures are the same as the processing procedure of step S110 in FIG. 5. Therefore, explanation of the processing procedures is omitted.

When the identity verification and the live nature confirmation processing are implemented on the server 110 side, the processing procedures of steps S208 and S209 are omitted. When the identity verification and the live nature confirmation processing are implemented on the terminal 120 side, the processing procedures of steps S206 and S207 are omitted.

Processing procedures of steps S208 and S209 are respectively the same as the processing procedures of steps S111 and S112 in FIG. 5. Therefore, explanation of the processing procedures is omitted.

<Display Form of the Photographing Guide in the First Embodiment>

Figure 7A:
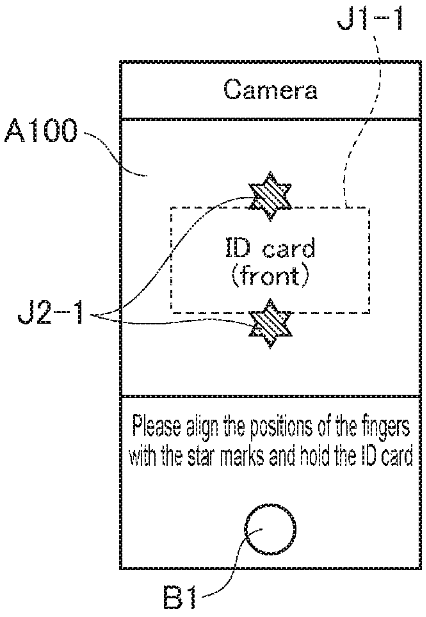
FIGS. 7A to 7E show examples of a photographing guide for an identification card displayed on a photographing screen of an information processing device according to the first embodiment.

FIGS. 7A to 8B show examples of the identification card photographing guide displayed on the photographing screen of the terminal 120. FIGS. 7A and 7B show examples of a photographing guide for holding to pinch the identification card with fingers. That is, the photographing guide may indicate positions where the fingers of the user and the identification card are in contact.

In the example shown in FIG. 7A, the display control unit 323 displays, in a display area A100, an output image of the camera, an object J1-1 indicating a position where the front surface of the identification card should be disposed in a frame of a photographed image, and objects J2-1 indicating positions where the identification card is held. The user directs the front surface of the identification card of the user to the camera while pinching the identification card with the thumb and the index finger (or the middle finger) in upper and lower positions where the objects J2-1 are displayed. The user touches the photographing button B1 in a state in which the contour of the identification card overlaps the object J1-1. When the photographing button B1 is touched, the output image of the camera photographed in the display area A100 is recorded as a photographed image. Note that the photographing guide may be recorded or may not be recorded in the photographed image.

Figure 7B:
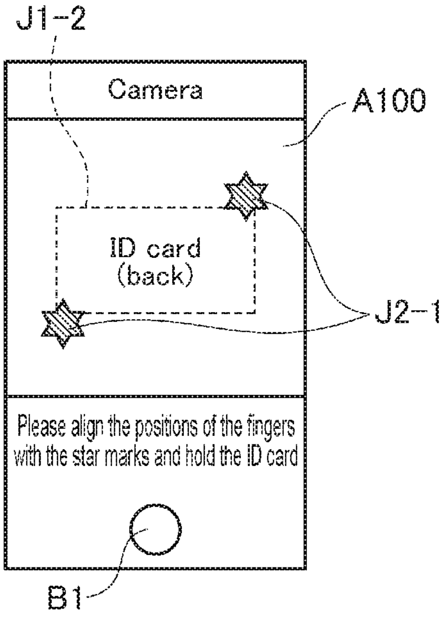

In the example shown in FIG. 7B, the display control unit 323 displays an object J1-2 indicating a position where the rear surface of the identification card should be disposed and objects J2-1 indicating positions where the identification card is held.

Figure 7C:
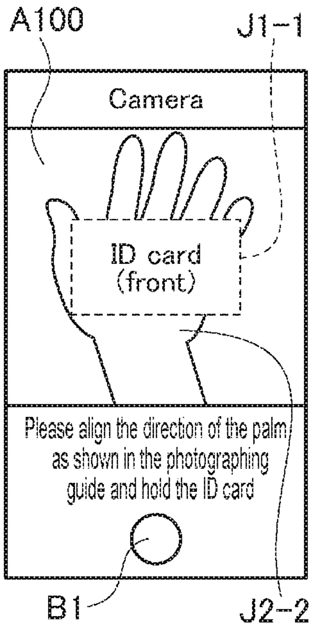
Figure 7D:
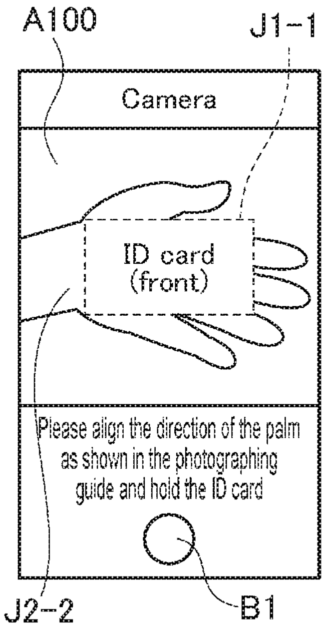
Figure 7E:
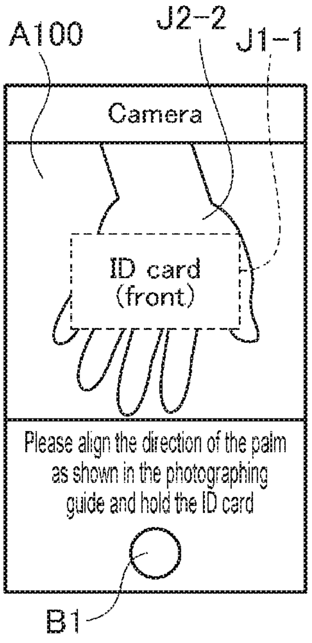

FIGS. 7C to 7E show examples of a photographing guide for placing the identification card on a palm and holding the identification card. In the examples shown in FIGS. 7C to 7E, the display control unit 323 displays, over an object J2-2 indicating a position of the right palm, the object J1-1 indicating the position where the front surface of the identification card should be disposed. That is, the photographing guide may indicate the direction of a hand of the user and the position of the identification card in the hand.

Note that the examples shown in FIGS. 7A to 7E can be applied to both of the photographing guide for the front surface of the identification card and the photographing guide for the rear surface of the identification card.

Figure 8A:
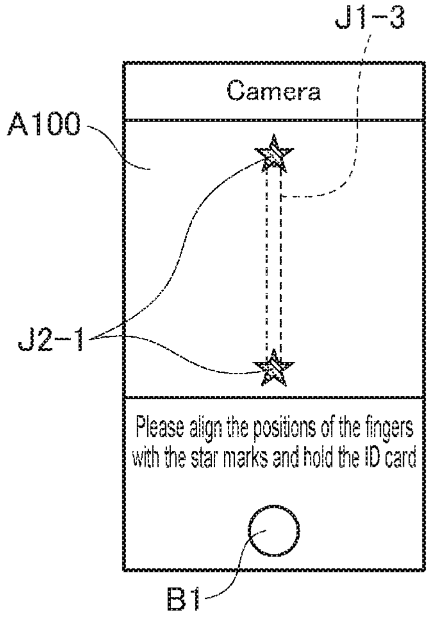
FIGS. 8A and 8B show examples of a photographing guide for an identification card displayed on the photographing screen of the information processing device according to the first embodiment.
Figure 8B:
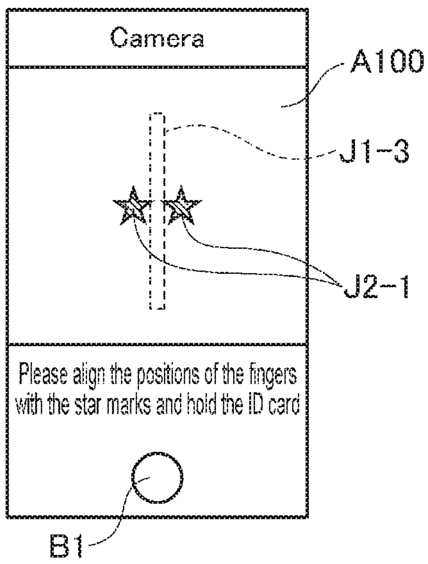
Figure 9A:
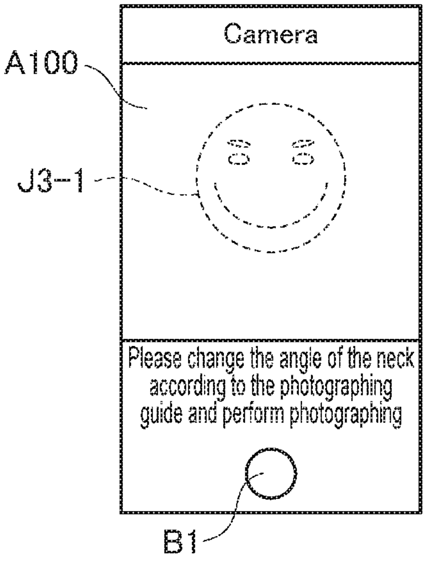
FIGS. 9A to 9D show examples of a photographing guide for a face displayed on a photographing screen of an information processing device according to a second embodiment.
Figure 9B:
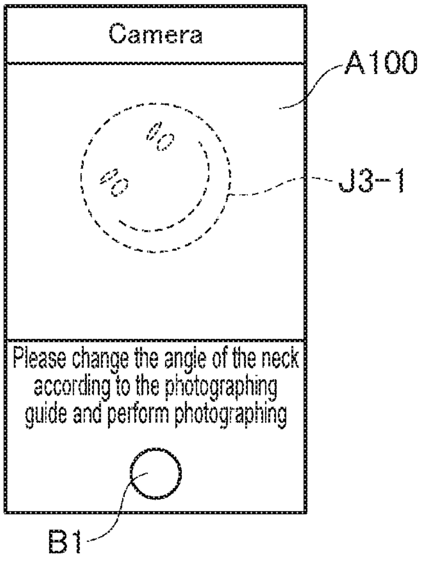
Figure 9C:
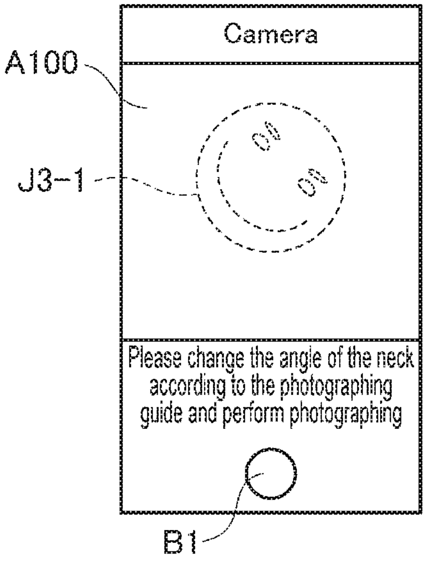
Figure 9D:
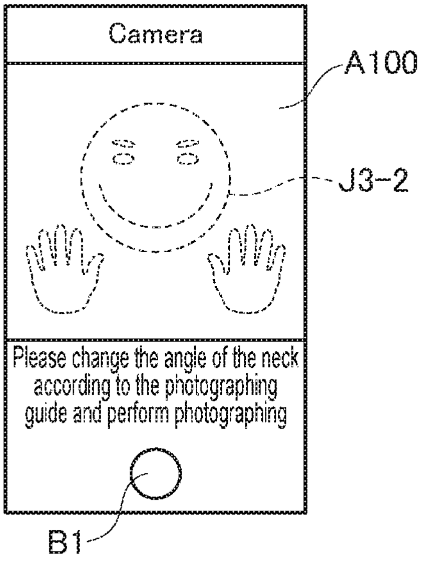

FIGS. 8A and 8B show examples of a photographing guide indicating a photographing method of the side surface of the identification card. In the example shown in FIG. 8A, the display control unit 323 displays an object J1-3 indicating a position where the side surface of the identification card should be disposed in a frame of a photographed image and displays, above and below the object J1-3, the objects J2-1 indicating the positions where the identification card is held. In the example shown in FIG. 8B, the display control unit 323 displays, in the center of the object J1-3, the objects J2-1 indicating the positions where the identification card is held.

Note that, in FIGS. 7A to 8B, the positions where the surface of the identification card should be disposed and the positions where the identification card is held are examples and are not limited to the positions shown in FIGS. 7A to 8B.

First Example of the First Embodiment

The photographing unit 324 of the terminal 120 may automatically photograph images of the identification card when a coincidence degree of the position of the identification card and the holding method of the identification card photographed in the image output from the camera and the position of the identification card and the holding method of the identification card indicated by the identification card photographing guide satisfies a predetermined standard (the positions of the identification card and the methods of holding the identification card coincide in a predetermined standard). More specifically, the photographing unit 324 may cause the photographing unit 324 to photograph an image when a coincidence degree of a positional relation between the identification card in the image photographing region and the part where the identification card is held in the body of the user and a positional relation in the photographing guide satisfies a predetermined standard. The coincidence degrees may be calculated by any method. However, for example, contours of the positions of the identification card and the hand and a contour of the face photographed in the image may be extracted and a ratio of a region fit in the frame of the photographing guide in a region surrounded by the contours may be set as a coincidence degree.

When images of the identification card are automatically photographed, the photographing unit 324 may stop the processing of the automatic photographing and switch the camera to a manual shutter when the coincidence degree of the image output from the camera and the photographing guide does not satisfy the predetermined standard even if a predetermined time elapses. Alternatively, the photographing unit 324 may reduce the predetermined standard stepwise as time elapses. Consequently, it is possible to reduce labor and time of user operation and reduce a situation in which the photographing itself cannot be performed when the photographing is not automatically performed well.

Second Example of the First Embodiment

A photographing difficulty degree may be defined for each variation in the identification card photographing guide. For example, in the examples shown in FIGS. 7A to 7E, the photographing difficulty degree may be defined to decrease in the order of FIG. 7E in which a wrist needs to be placed above the identification card, FIG. 7D in which the wrist needs to be placed on the left side of the identification card, and FIG. 7C in which the wrist only has to be placed below the identification card.

The authenticating unit 316 of the server 110 urges the user to photograph an image again when failing in the identity verification and the live nature confirmation. When urging the user to photograph an image again, the authenticating unit 316 may instruct, to the terminal 120 (the user), a photographing guide having a photographing difficulty degree lower than a photographing difficulty degree of the photographing guide already presented to the user. Consequently, it is possible to reduce likelihood that a difficult pose or the like is instructed to make photographing difficult.

Note that, in order to prevent photographing difficulty degrees of all photographed images (of the front surface, the rear surface, and a side surface of the identification card) from decreasing, the authenticating unit 316 may control a total of the photographing difficulty degrees of the photographed images to be equal to or higher than a predetermined difficulty degree. For example, when the photographing difficulty degree is reduced concerning the front surface of identification card, the authenticating unit 316 may perform processing for, for example, urging the user to photograph an image again at a high photographing difficulty degree concerning the rear surface of the identification card. Consequently, it is possible to prevent a situation in which the photographing is performed using only a simple pose or the like and reliability of the identity verification and the live nature confirmation is deteriorated.

Third Example of the First Embodiment

The display control unit 323 may receive, in response to an instruction from the user, a change of the photographing guide displayed on the photographing screen of the terminal 120. An upper limit may be provided for the number of times of a change request receivable from the user.

Fourth Example of the First Embodiment

The authenticating unit 316 or the authenticating unit 325 may extract a date of issue of the identification card photographed in the images of the identification card and, when the date of issue and a date when the image of the face is photographed are different by a predetermined period or more, urge the terminal 120 (the user) to stop the identity verification and the live nature confirmation processing and perform photographing using another identification card. Note that, when the identity verification and the live nature confirmation processing are performed on the server 110 side, the terminal 120 may extract the date of issue of the identification card photographed in the images of the identification card and transmit the date of issue to the server 110. Consequently, it is possible to improve a success rate of the identity verification and the live nature confirmation processing.

Fifth Example of the First Embodiment

The photographing unit 324 photographs an image in the processing procedures of steps S104 to S107 and transmits the photographed image to the server 110 in the processing procedure of step S109. However, the photographing unit 324 is not limited to this. For example, the photographing unit 324 may transmit, to the server 110, as moving image data (streaming data), all of states in which the user operates the screen of the terminal 120 to align the identification card to the photographing guide and photograph the face of the user. The server 110 may perform the identity verification and the live nature confirmation using moving image data rather than a still image. That is, the meaning of the term "image" may include either one or both of a still image and a moving image.

Second Embodiment

A second embodiment is an embodiment in which, when identity verification processing for a user is performed using images of an identification card (an identity verification document) and an image of a face of the user, a photographing method of an image of the face of the user is instructed on the site to guarantee that an image uploaded online is an image photographed on the site (live nature). The second embodiment can be independently executed or can be combined with the first embodiment. When the second embodiment is combined with the first embodiment, the identity verification and the confirmation of live nature are discriminated according to whether both of a photographing method of images of the identification card and a photographing method of an image of the face of the user conform to a designated photographing method.

In the second embodiment, the terminal 120 displays, on a screen on which photographing of the face of the user himself or herself is performed, information of a photographing guide indicating a face photographing method (hereinafter referred to as "face photographing guide"). The face photographing method includes a position of the face in a frame of a photographed image, a tilt for tilting the face, a pose during photographing and the like. The face photographing guide is changed every time the user photographs an image of the face.

The server 110 confirms, with image processing, whether an image of the face submitted online is an image photographed according to the instructed photographing guide to discriminate whether the photographed image is an image photographed on the site. When the photographed image is the image photographed according to the instructed photographing guide, it is guaranteed that the image is an image photographed on the site.

According to the second embodiment, the face photographing guide is changed every time the user photographs an image of the face. That is, it is difficult for the user to perform an act of photographing, beforehand, an image to be submitted online and submitting the image later and an act of processing and submitting an image photographed beforehand. That is, according to a second embodiment, there is an effect that it is possible to guarantee that an image submitted online is an image photographed on the site (live nature). Since the server 110 or the terminal 120 performs selection of a photographing guide for the face instructed to the user, it is possible to guarantee randomness of the photographing guide instructed to the user. There is an effect that it is possible to improve confirmation accuracy in performing the identity verification and the live nature confirmation.

<Functional Configuration of the Second Embodiment>

Concerning a functional configuration of the server 110, differences from the first embodiment are explained with reference to FIG. 3 again. Functional units not particularly referred to may be the same as the functional units in the first embodiment.

The selecting unit 313 has a function of selecting, out of a plurality of variations, a photographing guide that should be displayed on the screen of the terminal 120.

The photographing-guide transmitting unit 314 has a function of transmitting, to the terminal 120, photographing guide instruction information for instructing a face photographing guide, which is selected by the selecting unit 313 and should be displayed on the screen of the terminal 120, to the terminal 120. Note that, when the second embodiment is combined with the first embodiment, the photographing guide instruction information also includes an identification card photographing guide in addition to the face photographing guide.

The authenticating unit 316 has a function of performing the identity verification for the user and the live nature confirmation using images of the identification card of the user, an image of the face of the user, and attribute information of the user received by the image receiving unit 315.

More specifically, the authenticating unit 316 performs the identity verification for the user and the live nature confirmation based on:

1. a result obtained by comparing the face photographing method indicated by the face photographing guide and a face photographing method in the image of the face of the user received by the image receiving unit 315;

2. a result obtained by comparing an image of a face portion included in the images of the identification card of the user received by the image receiving unit 315 and the received image of the face of the user; and 3. a result obtained by comparing attribute information of the user included in the images of the identification card of the user received by the image receiving unit 315 and the received attribute information of the user.

Concerning a functional configuration of the terminal 120, differences from the first embodiment are explained with reference to FIG. 4 again. Functional units not particularly referred to may be the same as the functional units in the first embodiment.

The display control unit 323 has a function of displaying, over a photographing screen that displays an image output from the camera (the photographing device) included in the terminal 120, the face photographing guide instructed by the photographing guide instruction information from the server 110.

Note that, as specifically explained below, in the second embodiment, instead of the server 110, the terminal 120 itself may select the face photographing guide displayed on the screen of the terminal 120. In this case, the display control unit 323 may select the face photographing guide out of a plurality of variations according to a predetermined selection logic.

The photographing unit 324 has a function of photographing, in response to operation by the user, images of the identification card of the user and an image of the face of the user using the camera included in the terminal 120.

The photographing unit 324 may automatically photograph an image of the face when a coincidence degree of an image of the face of the user photographed in the image output from the camera and a position of the face and a tilt of the face indicated by the face photographing guide satisfies a predetermined standard.

<Operation Processing in the Second Embodiment>

Processing of the communication system 1 according to the second embodiment is explained with reference to FIG. 5 again. In the following explanation, only differences from the first embodiment are explained. Processing procedures not particularly explained may be the same as the processing procedures in the first embodiment.

In step S102, the selecting unit 313 of the server 110 selects the face photographing guide out of a plurality of variations. The selecting unit 313 may select photographing guides instructed to the terminal 120 respectively out of a plurality of variations at random or may select the photographing guides based on the present environment information (date, time, weather, position information of the terminal 120, etc.). For example, the photographing guides instructed to the terminal 120 may be decided in advance for each date (or each time, each weather, or each region). The selecting unit 313 may select, as the photographing guides instructed to the terminal 120, photographing guides corresponding to the present date (or the present time, the present weather, or the present region where the terminal 120 is present).

In step S103, the photographing-guide transmitting unit 314 of the server 110 transmits, to the terminal 120, photographing guide instruction information for instructing the face photographing guide selected in the processing procedure of step S102.

In step S104, the photographing unit 324 photographs an image of the front surface of the identification card at timing when a shutter button is depressed (or touched).

In step S105, the photographing unit 324 photographs an image of the rear surface of the identification card at the timing when the shutter button is depressed (or touched).

In step S106, the photographing unit 324 photographs an image of the side surface of the identification card at the timing when the shutter button is depressed (or touched).

In step S107, the display control unit 323 of the terminal 120 displays the face photographing guide instructed from the server 110 over the photographing screen that displays an output image of the camera. The user adjusts the position of the camera and the tilt of the face such that the face of the user overlaps the photographing guide displayed on the photographing screen. The photographing unit 324 photographs an image of the face of the user at the timing when the shutter button is depressed (or touched).

In step S108, the display control unit 323 of the terminal 120 displays, on the screen, the photographed images of the front surface, the rear surface, and the side surface of the identification card and the photographed image of the face of the user and urges the user to confirm whether the images may be transmitted to the server 110. At this time, in order to enable the user to confirm whether the photographed images are photographed according to the photographing guide, the display control unit 323 may display the photographed images and the photographing guide side by side or display the photographing guide over the photographed images. When the user permits the transmission, the processing proceeds to a processing procedure of step S109. When the user desires to photograph images again, photographing of images desired by the user is performed again.

In step S110, the authenticating unit 316 of the server 110 performs the identity verification processing for the user and the live nature confirmation processing using the received attribute information of the user, the received images of the front surface, the rear surface, and the side surface of the identification card, and the received image of the face of the user.

First, the authenticating unit 316 compares a photographing method of the face in the face photographing guide instructed to the terminal 120 and the image of the face of the user to confirm that the photographed images are photographed according to the photographing guide. For example, the authenticating unit 316 analyzes the image of the face to specify a position and a tilt of the face on the entire screen. When deviation between the specified position and the specified tilt and a position and a tilt of the face in the photographing guide is equal to or smaller than a predetermined threshold, the authenticating unit 316 may determine that the image of the face of the user is photographed according to the photographing guide.

Subsequently, the authenticating unit 316 compares an image of a face portion included in the images of the identification card and the image of the face of the user and confirms that the respective images satisfy a predetermined coincidence determination standard to confirm that a person photographed in the identification card and the user are the same person. For example, the authenticating unit 316 extracts feature values of the face photographed in the respective images and, when a difference between the feature values is equal to or smaller than a predetermined value, the authenticating unit 316 may determine that the person photographed in the identification card and the user are the same person.

Subsequently, the authenticating unit 316 compares attribute information of the user included in the images of the identification card and attribute information of the user input to the terminal 120 by the user to confirm whether the attribute information input by the user coincides with a described matter of the identification card.

For example, the authenticating unit 316 may read a character string photographed in the images of the identification card and, when the read character string and the input attribute information of the user coincide, determine that the attribute information input by the user coincides with the described matter of the identification card.

When all of the items "the image of the face is photographed according to the photographing guide", "the person photographed in the identification card and the user are the same person", and "the attribute information input by the user coincides with the described matter of the identification card" are successfully confirmed, the authenticating unit 316 determines that the user is a service applicant himself or herself and the image is photographed on the site (has live nature).

In the processing procedures explained with reference to FIG. 5 above, display data for displaying the face photographing guide on the screen of the terminal 120 may be stored in the storing unit 326 in the terminal 120 in advance in association with an identifier for uniquely identifying data of the photographing guide. In this case, the photographing-guide transmitting unit 314 of the server 110 may transmit the identifier of the photographing guide to the terminal 120 as the photographing guide instruction information. Alternatively, the display data for displaying the face photographing guide on the screen of the terminal 120 may be stored in the storing unit 317 of the server 110. The photographing-guide transmitting unit 314 of the server 110 may transmit the display data itself of the photographing guide to the terminal 120 as the photographing guide instruction information. Since the identifier has a data size smaller than a data size of the display data, the former method can reduce a communication data amount in the server 110 and the terminal 120 compared with the latter method. On the other hand, compared with the former method, the latter method can perform the update of the display data on a real-time basis.

FIG. 6 shows an example of a sequence showing processing of the communication system 1 according to the embodiment. A sequence example in which the terminal 120 itself determines the face photographing guide displayed on the screen of the terminal 120 is explained with reference to FIG. 6.

In step S201, the photographing unit 324 photographs an image of the front surface of the identification card at the timing when the shutter button is depressed (or touched).

In step S202, the photographing unit 324 photographs an image of the rear surface of the identification card at the timing when the shutter button is depressed (or touched).

In step S203, the photographing unit 324 photographs an image of the side surface of the identification card at the timing when the shutter button is depressed (or touched).

In step S204, the display control unit 323 of the terminal 120 selects, out of a plurality of variations, the face photographing guide displayed on the photographing screen. A selecting method may be the same as the method performed by the selecting unit 313 of the server 110 explained in step S102 in FIG. 5. Subsequently, the photographing unit 324 photographs an image of the face of the user at the timing when the shutter button is depressed (or touched).

A processing procedure of step S205 is the same as the processing procedure of step S108 in FIG. 5. Therefore, explanation of the processing procedure is omitted.

In step S206, the communication unit 322 transmits, to the server 110, the attribute information of the user input in the processing procedure of step S200, the images of the front surface, the rear surface, and the side surface of the identification card, the image of the face of the user, and the photographing guide information. The photographing guide information includes information for specifying the face photographing guide selected by the terminal 120.

In step S207, the authenticating unit 316 of the server 110 performs the identity verification for the user and live nature confirmation processing using the received attribute information of the user, the received images of the front surface, the rear surface, and the side surface of the identification card, the received image of the face of the user, and the photographing guide information. The authenticating unit 316 of the server 110 recognizes, referring to the photographing guide information, according to which photographing guide the user performs the photographing. The other processing procedures are the same as the processing procedure of step S110 in FIG. 5. Therefore, explanation of the processing procedures is omitted.

<Display Form of the Photographing Guide in the Second Embodiment>

FIGS. 9A to 10B show examples of the face photographing guide displayed on the photographing screen of the terminal 120. An output image of the camera and an object J3-1 indicating a position of the face and a tilt of the face in a frame of a photographed image are displayed in the display area A100. The example shown in FIG. 9A indicates that the face should be photographed in a state in which the face is not tilted. The examples shown in FIGS. 9B and 9C indicate that the face should be photographed with the face tilted. FIG. 9D shows an example of an object J3-2 indicating that the face should be photographed while taking a pose. In addition to a position where the face should be disposed and a tilt of the face, the object J3-2 indicates that a palm should be photographed obliquely below the face.

Figure 10A:
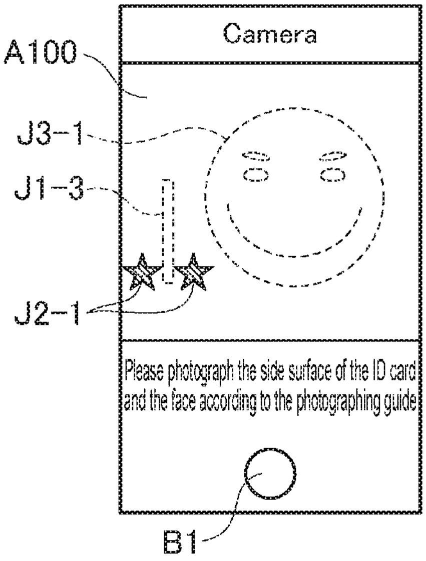
FIGS. 10A and 10B show examples of a photographing guide for a face displayed on the photographing screen of the information processing device according to the second embodiment.
Figure 10B:
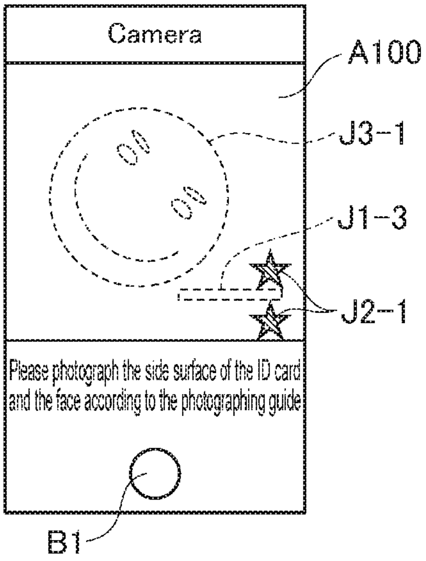

In the examples shown in FIGS. 10A and 10B, the display control unit 323 displays, in the face photographing guide, both of an object indicating a position of the face and a tilt of the face in the frame of the photographed image and an object indicating a position of the side surface of the identification card and a holding method of the identification card in the frame of the photographed image. In the examples shown in FIGS. 10A and 10B, confirmation of live nature is performed using at least the image of the face and the image of the side surface of the identification card. Since the side surface of the identification card has a narrow area, it is possible to reduce a burden on the user by instructing to photograph the face and the side surface of the identification card together. Since the number of images transmitted from the terminal 120 to the server 110 decreases, it is possible to reduce a communication data amount. In the example shown in FIG. 10A, the object J3-1 indicating a position of the face and a tilt of the face in the frame of the photographed image, the object J1-3 indicating a position of the side surface of the identification card in the frame of the photographed image, and the object J2-1 indicating a holding method are displayed. In the example shown in FIG. 10B, the object J3-1 in a state in which the face tilts is displayed.

First Example of the Second Embodiment

When a tilt of the face is instructed in the face photographing guide, the authenticating unit 316 or the authenticating unit 325 may change to be looser, as an angle difference between an axis in the up-down direction of the face and an axis in the up-down direction of the screen (the photographing screen) of the terminal 120 is larger, the determination standard for determining whether the face photographing method indicated by the face photographing guide and the face photographing method in the received image of the face of the user coincide. For example, when a tilt of the face is absent, if a coincidence rate of feature values is 90% or more, it is assumed that the image of the face is photographed according to the face photographing guide. In this case, the authenticating unit 316 may change the determination standard to be looser as the angle difference is larger to, for example, when the tilt of the face is 30 degrees, if the coincidence rate of the feature values is 70% or more, determine that the image of the face is photographed according to the face photographing guide. Consequently, when the tilt of the face is present, it is possible to improve a success rate of the identity verification and the live nature confirmation processing.

Second Example of the Second Embodiment

A photographing difficulty degree may be defined for each variation in the face photographing guide.

When failing in the identify verification and the live nature confirmation, the authenticating unit 316 of the server 110 urges the user to photograph an image again. When urging the user to photograph an image again, the authenticating unit 316 may instruct, to the terminal 120 (the user), a photographing guide having a photographing difficulty degree lower than the photographing difficulty degree of the photographing guide already presented to the user. Consequently, it is possible to reduce likelihood that a difficult pose or the like is instructed to make photographing difficult.

Note that, in order to prevent the photographing difficulty degree of the photographed image of the face from decreasing, the authenticating unit 316 may control a total of the photographing difficulty degrees of photographed images to be equal to or higher than a predetermined difficulty degree. For example, when the photographing difficulty degree is reduced concerning the front surface of identification card, the authenticating unit 316 may perform processing for, for example, urging the user to photograph an image again at a high photographing difficulty degree concerning the image of the face. Consequently, it is possible to prevent a situation in which the photographing is performed using only a simple pose or the like and reliability of the identity verification and the live nature confirmation is deteriorated.

Third Embodiment

A third embodiment is an embodiment in which, concerning a photographing guide indicating a photographing position of a side surface of an identification card, a position of the photographing guide and a tilt of the photographing guide are changed in a photographing screen. Other points not particularly referred to may be the same as the points in the first embodiment.

According to the third embodiment, the photographing guide for the side surface of the identification card is changed every time a user photographs an image of the side surface of the identification card. That is, it is difficult for the user to perform an act of photographing, beforehand, an image to be submitted online during identity verification and live nature confirmation and submitting the image later and an act of processing and submitting an image photographed beforehand. That is, according to the third embodiment, there is an effect that it is possible to guarantee that an image of the side surface of the identification card submitted online during the identity verification and the live nature confirmation is an image photographed on the site (live nature). It is unnecessary to prepare photographing guides of a plurality of variations in advance as the photographing guide for the side surface of the identification card instructed to the user. Therefore, there is an effect that it is possible to reduce a memory area in which the server 110 and the terminal 120 store data concerning photographing guides of a plurality of variations.

<Functional Configuration of the Third Embodiment>

Concerning a functional configuration of the server 110, differences from the first embodiment are explained with reference to FIG. 3 again. Functional units not particularly referred to may be the same as the functional units in the first embodiment.

The image receiving unit 315 further receives, from the terminal 120, an image of the side surface of the identification card of the user and information indicating a position and a tilt of the photographing guide indicating a photographing position of the side surface of the identification card on the screen of the terminal 120.

The authenticating unit 316 has a function of performing the identity verification for the user and the live nature confirmation processing using the images of the identification card of the user, the image of the face of the user, the attribute information of the user, and the information indicating the position and the tilt of the photographing guide indicating the photographing position of the side surface of the identification card received by the image receiving unit 315.

More specifically, concerning the comparison processing for the image of the side surface of the identification card in the identity verification and the live nature confirmation processing in the first embodiment, the authenticating unit 316 performs the identify verification for the user and the live nature confirmation based on a comparison result of the position and the tilt of the photographing guide for the side surface of the identification card on the photographing screen of the terminal 120 and a photographing position (a position and a tilt) of an image of the side surface of the identification card photographed in the image of the side surface of the identification card of the user.

Concerning the functional configuration of the terminal 120, differences from the first embodiment are explained with reference to FIG. 4 again. Functional units not particularly referred to may be the same as the functional units in the first embodiment.

The display control unit 323 has a function of determining, according to a predetermined logic, a position and a tilt in display of the photographing guide for the side surface of the identification card and displaying the photographing guide in the photographing screen according to the determined position and the determined tilt.

Note that the display control unit 323 may determine a position and a tilt of the photographing guide on the photographing screen by rotating the photographing guide indicating a photographing position of the side surface of the identification card along the surface of the photographing screen around an axis in the vertical direction with respect to the photographing screen and stopping the rotation when predetermined operation is performed. The photographing guide indicating the photographing position of the side surface of the identification card may include or may not include a photographing guide indicating a holding method of the side surface of the identification card.

<Display Form of the Photographing Guide in the Third Embodiment>

Figure 11A:
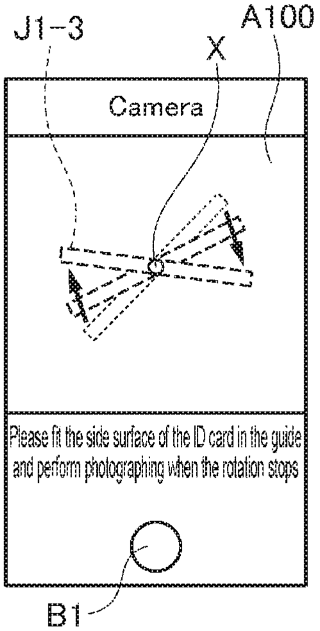
FIGS. 11A to 11C show examples of a photographing guide for a side surface of an identification card displayed on a photographing screen of an information processing device according to a third embodiment.
Figure 11B:
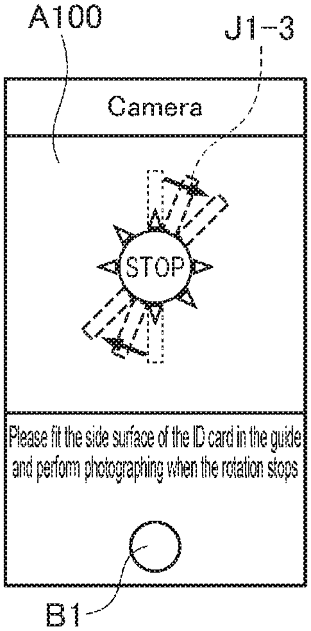
Figure 11C:
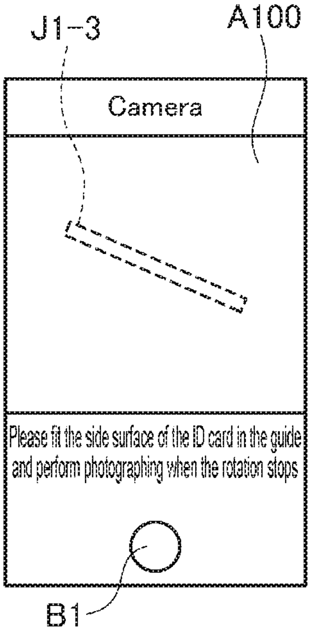

FIGS. 11A to 11C are diagrams showing examples of the photographing guide for the side surface of the identification card displayed on the photographing screen of the terminal 120 according to the third embodiment. In the photographing guide for the side surface of the identification card shown in FIGS. 11A to 11C, a rectangular photographing guide rotates around a rotation axis X like a roulette (FIGS. 11A and 11B) and stops after a predetermined time elapses or in response to user operation (e.g., touching a STOP icon in FIG. 11B)) (FIG. 11C). The user aligns the side surface of the identification card with the stopped photographing guide and performs photographing. Note that, in FIGS. 11A to 11C, a position of the rotation axis X, rotating speed, and a rotating direction are examples and are not limited to this. A method of moving the photographing guide for the side surface of the identification card is not limited to the rotation. For example, the photographing guide may move to the front and the rear and the left and the right in the photographing screen. The rotation axis X may move to the front and the rear and the left and the right in the photographing screen while the photographing guide rotates. A position in the photographing screen where the photographing guide for the side surface is displayed is not limited to the position shown in FIGS. 11A to 11C and, for example, may be determined at random.

After the photographing guide stops, the communication unit 322 of the terminal 120 transmits, to the server 110, information indicating a position (and/or an angle) where the photographing guide stops. For example, in the processing procedure of step S109 in FIG. 5, the communication unit 322 may transmit to the server 110, together with the photographed image, information indicating a position where a guide for instructing a photographing position of the side surface of the identification card stops.

Figure 12A:
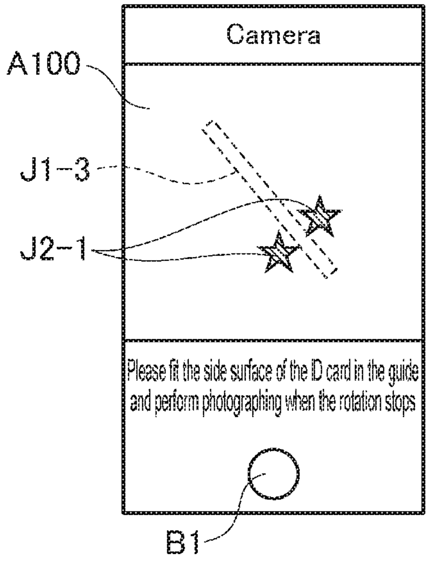
FIGS. 12A to 12E show examples of a photographing guide for a side surface of an identification card displayed on the photographing screen of the information processing device according to the third embodiment.

FIGS. 12A to 12E are diagrams showing an example of a photographing guide for the side surface of the identification card displayed on the photographing screen of the terminal 120 according to the third embodiment. As shown in FIG. 12A, the photographing guide for the side surface of the identification card may include a holding method of the identification card. The display control unit 323 may display the photographing guide indicating the holding method of the side surface of the identification card after the photographing guide stops or may continue to display the photographing guide for the side surface of the identification card from the time when the photographing guide is rotating.

Figure 12B:
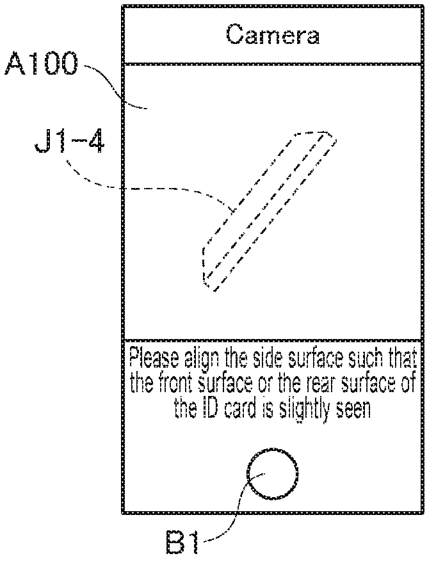

As shown in FIG. 12B, the photographing guide for the side surface of the identification card may be an object J1-4 indicating that, in a range in which the side surface of the identification card can be confirmed, the identification card should be tilted and photographed such that the front surface or the rear surface of the identification card is also photographed together with the side surface of the identification card. The display control unit 323 may select, at random, an angle for tilting the identification card. Specifically, the display control unit 323 may select, at random, in a range of a predetermined angle (e.g., 10 to 45 degrees), an angle for tilting the rotation axis X with respect to the photographing screen and display the object J1-4, the rotation axis X of which is tilted at the predetermined angle. By photographing the front surface and the rear surface of the identification card together with the side surface of the identification card, it is possible to prevent an illegal act of photographing a side surface of a credit card or the like other than the identification card.

Figure 12C:
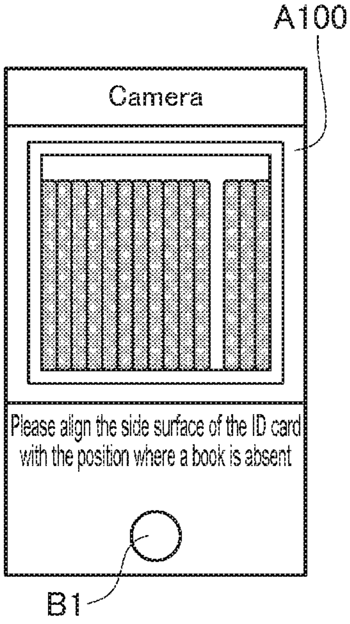
Figure 12D:
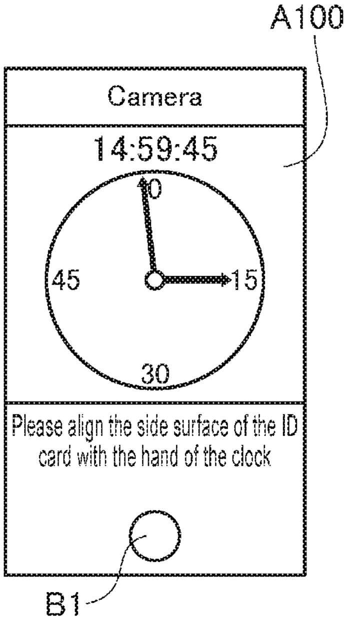
Figure 12E:

The photographing guide for the side surface of the identification card may not be a rectangular photographing guide. For example, the photographing guide may be an object for instructing to align the side surface of the identification card with a position where a book is absent in a bookshelf as shown in FIG. 12C and photograph the side surface of the identification card. In FIG. 12C, the display control unit 323 may move, at a predetermined time interval (e.g., at one second interval), the position where a book is absent and stop the position in a position where the user touches the screen. As shown in FIG. 12D, the photographing guide for the side surface of the identification card may be an object for instructing to align the side surface of the identification card with a hand of a clock. As shown in FIG. 12E, the photographing guide for the side surface of the identification card may be an object for instructing to complete a character by fitting the side surface of the identification card into a missing part of the character.

<Operation Processing in the Third Embodiment>

Processing of the communication system 1 according to the third embodiment is explained with reference to FIGS. 5 and 6 again. In the following explanation, only differences from the first embodiment are explained. Processing procedures not particularly explained may be the same as the processing procedures in the first embodiment.

When performing the photographing of the side surface of the identification card in the processing procedure of step S106 in FIG. 5 or step S203 in FIG. 6, the photographing unit 324 of the terminal 120 may automatically photograph an image of the side surface of the identification card when a coincidence degree of a photographing position of the side surface of the identification card photographed in the image output from the camera included in the terminal 120 and a photographing position of the side surface of the identification card indicated by the identification card photographing guide satisfies a predetermined standard. The coincidence degree may be calculated by any method. However, for example, a contour of the side surface of the identification card photographed in the image may be extracted and a ratio of a region fit in the frame of the photographing guide in a region surrounded by the extracted contour may be set as a coincidence degree.

When the side surface of the identification card is automatically photographed, the photographing unit 324 may transmit information indicating that the side surface of the identification card is automatically photographed to the server 110 in the processing procedure of step S109 in FIG. 5 or step S206 in FIG. 6. The information may be information explicitly indicating that the side surface of the identification card is automatically photographed or may be information implicitly indicating, by not transmitting the image of the side surface of the identification card from the terminal 120 to the server 110, that the side surface of the identification card is automatically photographed.

When receiving, from the terminal 120, the information indicating that the side surface of the identification card is automatically photographed, the server 110 may exclude the side surface of the identification card from a target of the identity verification and the live nature confirmation processing in the processing procedure of step S110 in FIG. 5 or step S207 in FIG. 6. Specifically, the authenticating unit 316 may perform the identity verification for the user and the live nature confirmation without performing the comparison of the information indicating the photographing position of the side surface of the identification card and the photographing position of the image of the side surface of the identification card photographed in the image of the side surface of the identification card of the user. When the terminal 120 itself performs the identity verification and the live nature confirmation in step S111 in FIG. 5 or step S208 in FIG. 6, similarly, the server 110 may exclude the side surface of the identification card from the target of the identity verification and the live nature confirmation processing.

Fourth Embodiment

A fourth embodiment is an embodiment in which, when identity verification for a user and live nature confirmation processing are performed using images of an identification card and an image of a face of the user, instead of performing confirmation of live nature according to whether the images are photographed according to the photographing guide as in the first to third embodiments, confirmation of live nature is performed by comparing position information during photographing added to the images of the identification card and the image of the face and a present position of the terminal 120 and confirming that the position information during the photographing and the present position of the terminal 120 are included in a predetermined range. Note that the images of the identification card and the image of the face of the user may be collectively referred to as "identity verification image" as well (the same applies in other embodiments). Besides, points not particularly referred to may be the same as the points in the first to third embodiments. Note that the fourth embodiment may be combined with the first embodiment, the second embodiment, and/or the third embodiment. That is, in addition to the comparison of the position information, live nature may be confirmed by confirming that photographed images conform to a photographing guide.

According to the fourth embodiment, the confirmation of the live nature is performed by confirming whether the position information during the photographing and the position information of the terminal 120 are within the predetermined range. Consequently, it is difficult for the user to perform an act of photographing, beforehand, an image to be submitted online during identity verification and live nature confirmation and submitting the image later and an act of processing and submitting an image photographed beforehand. That is, according to the fourth embodiment, there is an effect that it is possible to guarantee that an image of a side surface of the identification card submitted online during the identity verification and the live nature confirmation is an image photographed on the site (live nature). Compared with the first and third embodiments, it is unnecessary to store the photographing guide for the identification card. Therefore, there is an effect that it is possible to reduce the memory areas of the server 110 and the terminal 120.

<Functional Configuration in the Fourth Embodiment>

A functional configuration of the server 110 is explained with reference to FIG. 3 again. Note that, when the fourth embodiment is not combined with the first embodiment, the second embodiment, and/or the third embodiment, the selecting unit 313 and the photographing-guide transmitting unit 314 shown in FIG. 3 are unnecessary.

The image receiving unit 315 has a function of receiving, from the terminal 120, position information of the terminal 120, images of the identification card of the user added with position information during photographing, an image of the face of the user added with position information during the photographing, and attribute information of the user input by the user.

The authenticating unit 316 has a function of approving the identification card of the user as at least a part of the identity authentication for the user when the position information of the terminal 120 and the position information added to the images of the identification card of the user are within a predetermined range. The authenticating unit 316 has a function of performing the identity verification for the user and the live nature confirmation based on a comparison result of the position information of the terminal 120, the position information added to the images of the identification card of the user, and the position information added to the image of the face of the user, a comparison result of an image of a face portion included in the received images of the identification card of the user and the received image of the face of the user, and a comparison result of attribute information of the user included in the received images of the identification card of the user and the received attribute information of the user.

Figure 13:
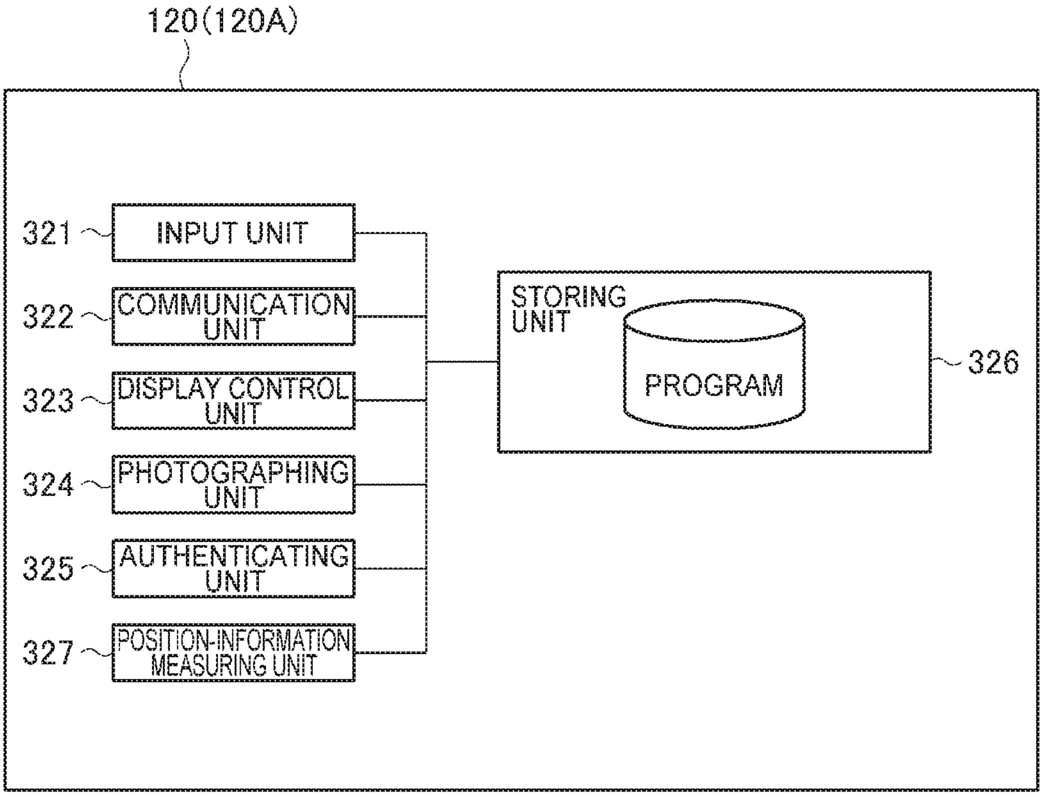
FIG. 13 shows an example of a block diagram showing a functional configuration of an information processing device according to the third embodiment.

Concerning a functional configuration of the terminal 120, differences from the first embodiment are explained with reference to FIG. 13. The terminal 120 according to the fourth embodiment further includes a position-information measuring unit 327 in addition to the configuration explained in the first embodiment. The display control unit 323, the photographing unit 324, the authenticating unit 325, and the position-information measuring unit 327 are realized by the processor 201 reading out and executing programs stored in the storing unit 326.

The functional configuration of the terminal 120 according to this embodiment is explained in detail below. Note that the input unit 321 is the same as the input unit 321 in the first embodiment. Therefore, explanation of the input unit 321 is omitted.

The communication unit 322 has a function of performing processing for receiving various data from the server 110 via the communication I/F 205 and processing for transmitting various data to the server 110 using the communication I/F 205. The communication unit 322 has a function of transmitting, to the server 110, images of the identification card of the user photographed by the photographing unit 324 and added with position information during the photographing, an image of the face of the user added with position information during the photographing, and attribute information of the user received by the input unit 321.

The display control unit 323 has a function of displaying, on a photographing screen, an image output from the camera (the photographing device) included in the terminal 120.

The photographing unit 324 has a function of photographing, in response to operation by the user, images of the identification card of the user and an image of the face of the user using the camera included in the terminal 120. The photographing unit 324 has a function of adding position information indicating position during the photographing to the photographed images of the identification card of the user and the photographed image of the face of the user.

The authenticating unit 325 has a function of performing the identity verification processing for the user and the live nature confirmation processing using the images of the identification card of the user and the image of the face of the user photographed by the photographing unit 324, the attribute information of the user input to the input unit 321, and the position information of the terminal 120. Note that, as in the first to third embodiments, when the terminal 120 itself does not perform the identity verification processing and the live nature confirmation processing, the terminal 120 does not include the authenticating unit 325.

The position-information measuring unit 327 has a function of measuring position information of a present position of the terminal 120. The position-information measuring unit 327 measures latitude and longitude of the terminal 120 as the position information of the present position of the terminal 120 using, not as a limitation but as an example, a GPS (Global Positioning System). Note that the measurement of the position information of the terminal 120 by the position-information measuring unit 327 is not limited to the GPS. Any method may be used for the measurement. The position-information measuring unit 327 may measure the position information of the terminal 120 using, not as a limitation but as an example, a wireless LAN such as Wi-Fi. Besides, the position-information measuring unit 327 may measure the position information of the terminal 120 using, not as a limitation but as an example, a communication system such as an IMES (Indoor MEssaging System), an RFID (Radio Frequency Identifier), or a BLE (Bluetooth Low Energy). The position-information measuring unit 327 may measure the position information of the terminal 120 using, not as a limitation but as an example, a mobile communication system such as a LTE or a CDMA.

<Operation Processing in the Fourth Embodiment>

Figure 14:
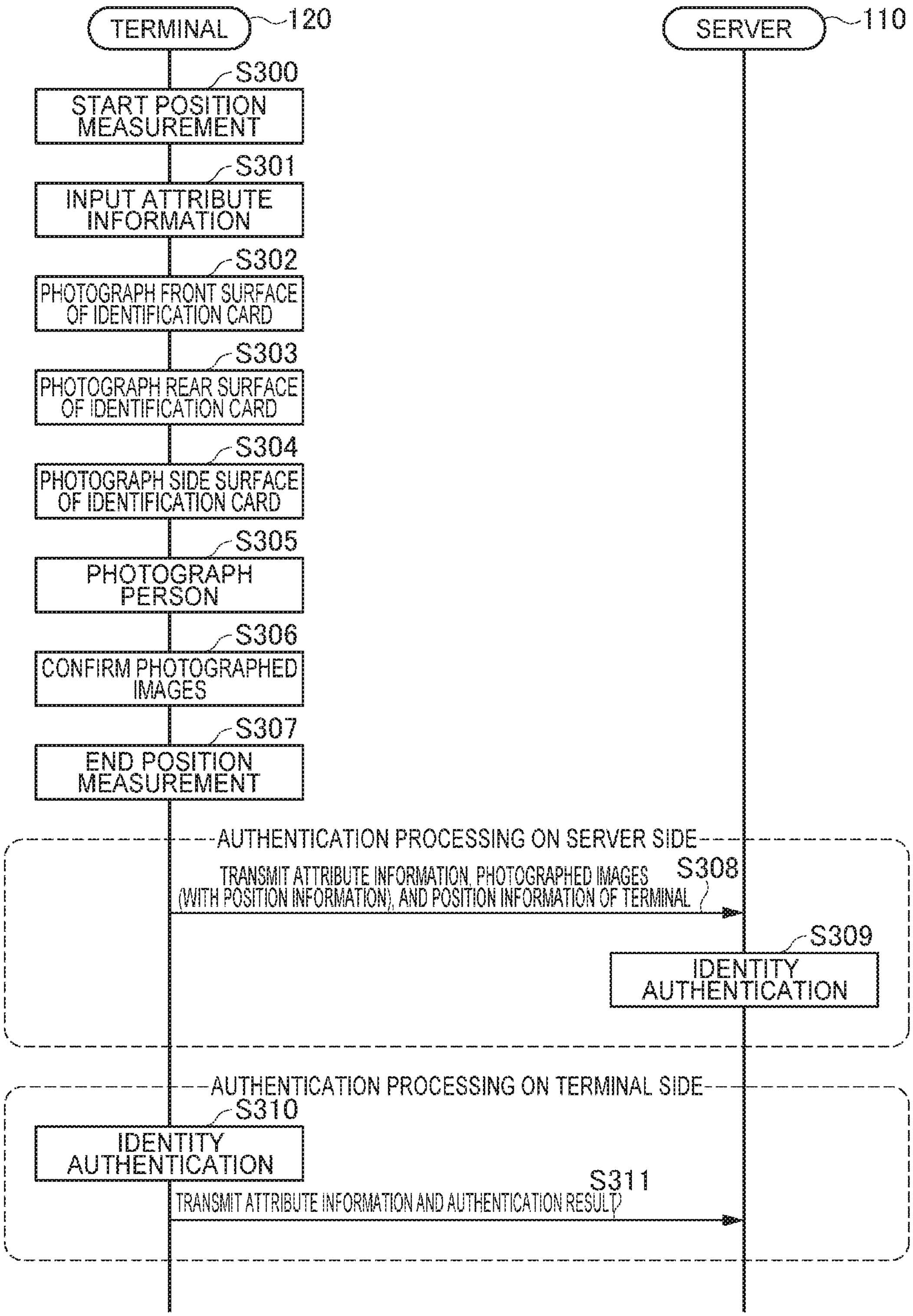
FIG. 14 shows an example of a sequence of processing of a communication system according to a fourth embodiment.

Processing of the communication system 1 according to the fourth embodiment is explained with reference to FIG. 14. FIG. 14 shows an example of a sequence of the processing of the communication system 1 according to the fourth embodiment.

In step S300, the position-information measuring unit 327 of the terminal 120 starts measurement of a present position of the terminal 120.

A processing procedure of step S301 is the same as the processing procedure of step S100 in FIG. 5. Therefore, explanation of the processing procedure is omitted.

In step S302, the photographing unit 324 photographs an image of the front surface of the identification card at timing when a shutter button is depressed (or touched) and adds position information indicating a position during the photographing of the terminal 120 to the photographed image.

In step S303, the photographing unit 324 photographs an image of the rear surface of the identification card at the timing when the shutter button is depressed (or touched) and adds position information indicating a position during the photographing of the terminal 120 to the photographed image.

In step S304, the photographing unit 324 photographs an image of the side surface of the identification card at the timing when the shutter button is depressed (or touched) and adds position information indicating a position during the photographing of the terminal 120 to the photographed image.

In step S305, the photographing unit 324 photographs an image of the face of the user at the timing when the shutter button is depressed (or touched) and adds position information indicating a position during the photographing of the terminal 120 to the photographed image.

In step S306, the display control unit 323 of the terminal 120 displays the photographed images of the front surface, the rear surface, and the side surface of the identification card and the photographed image of the face of the user and urges the user to confirm whether the images may be transmitted to the server 110. When the user permits the transmission, the processing proceeds to a processing procedure of step S307. When the user desires to photograph images again, the photographing of images desired by the user is performed again.

In step S307, the position-information measuring unit 327 of the terminal 120 ends the measurement of the present position of the terminal 120.

In step S308, the communication unit 322 transmits, to the server 110, the attribute information of the user input in the processing procedure of step S301, the images of the front surface, the rear surface, and the side surface of the identification card, the image of the face of the user, and the position information indicating the present position of the terminal 120.

In step S309, the authenticating unit 316 of the server 110 performs the identity verification processing for the user and the live nature confirmation processing using the received attribute information of the user, the received images of the front surface, the rear surface, and the side surface of the identification card, the received image of the face of the user, and the received position information indicating the present position of the terminal 120.

At this time, the authenticating unit 316 confirms that the position information indicating the present position of the terminal 120, position information given to the respective images of the front surface, the rear surface, and the side surface of the identification card of the user, and position information given to the image of the face of the user are included in a predetermined range.

Subsequently, the authenticating unit 316 compares an image of a face portion included in the images of the identification card and the image of the face of the user and confirms that a result of the comparison satisfies a predetermined coincidence determination standard to confirm that a person photographed in the identification card and the user are the same person. A specific processing procedure is the same as the processing procedure in the first embodiment. Therefore, explanation of the processing procedure is omitted.

Subsequently, the authenticating unit 316 compares attribute information of the user included in the images of the identification card and the attribute information of the user input to the terminal 120 by the user to confirm that the attribute information input by the user coincides with a described matter of the identification card. A specific processing procedure is the same as the processing procedure in the first embodiment. Therefore, explanation of the processing procedure is omitted.

When all of the items "the position information indicating the present position of the terminal 120, the position information given to the respective images of the front surface, the rear surface, and the side surface of the identification card of the user, and the position information given to the image of the face of the user are included in the predetermined range", "the image of the face portion included in the images of the identification card of the user and the image of the face of the user satisfy the predetermined coincidence determination standard", and "the attribute information of the user included in the images of the identification card of the user and the received attribute information of the user coincide" are successfully confirmed, the authenticating unit 316 determines that the user is a service applicant himself or herself (identification verification confirmed) and the image is photographed on the site (has live nature).

On the other hand, a processing procedure performed by the authenticating unit 316 when any one of the items is not successfully confirmed is the same as the processing procedure in the first embodiment, the second embodiment, or the third embodiment. Therefore, explanation of the processing procedure is omitted.

Processing procedures of steps S310 and S311 indicate processing procedures in which the identity verification processing and the live nature confirmation processing are implemented on the terminal 120 side rather than the server 110 side. When the identity verification processing and the live nature confirmation processing are implemented on the server 110 side, the processing procedures of steps S310 and S311 are omitted. When the identity verification processing and the live nature confirmation processing are implemented on the terminal 120 side, the processing procedures of steps S308 and S309 are omitted.

The identity verification processing and the live nature confirmation processing performed by the authenticating unit 325 of the terminal 120 in step S310 are the same as the identity verification processing and the live nature confirmation processing performed by the authenticating unit 316 of the server 110 in the processing procedure of step S309. Therefore, explanation of the identity verification processing and the live nature confirmation processing is omitted.

The processing procedure of step S311 is the same as the processing procedure of step S112 in FIG. 5. Therefore, explanation of the processing procedure is omitted.

First Example of the Fourth Embodiment

Note that, in the fourth embodiment, in addition to comparing the position information given to the image and the position information of the terminal 120, photographing time given to the image and the present time may be compared to perform the confirmation of the live nature.

For example, the photographing unit 324 of the terminal 120 adds, in addition to the position information, time during the photographing to the photographed images of the front surface, the rear surface, and the side surface of the identification card of the user and the photographed image of the face of the user. The communication unit 322 transmits, to the server 110, the images of the front surface, the rear surface, and the side surface of the identification card of the user added with the position information and the time during the photographing and the image of the face of the user added with the position information and the time during the photographing. The image receiving unit 315 of the server 110 receives the images of the identification card of the user added with the position information and the time during the photographing and the image of the face of the user added with the position information and the time during the photographing.

The authenticating unit 316 of the server 110 performs the identity verification for the user and the live nature confirmation based on a comparison result of the present time (or time when the images of the identification card are received from the terminal 120, the same applies in other examples), the time given to the images of the identification card of the user, and the time given to the image of the face of the user in addition to the comparison result of the position information. Specifically, the authenticating unit 316 may determine that the live nature is successfully confirmed when the present time, the time given to the respective images of the front surface, the rear surface, and the side surface of the identification card of the user, and the time given to the image of the face of the user are within a predetermined range. The predetermined range may be, not as a limitation but as an example, three minutes or less or five minutes or less.

The first example explained above can also be applied when the authenticating unit 325 of the terminal 120 performs the identity verification and the live nature confirmation.

Fifth Embodiment

A fifth embodiment is an embodiment in which, when identity verification for a user and live nature confirmation processing are performed using images of an identification card and an image of a face of the user, instead of performing confirmation of live nature according to whether the images are photographed according to the photographing guide as in the first to third embodiments, confirmation of live nature is performed by comparing time information during photographing added to the images of the identification card and the image of the face and present time and confirming that the time during the photographing and the present time are included in a predetermined range. Besides, points not particularly referred to may be the same as the points in the first to third embodiments. Note that the fifth embodiment may be combined with the first embodiment, second embodiment and/or the third embodiment. That is, in addition to the comparison of the time information, live nature may be confirmed by confirming that photographed images conform to a photographing guide. The fifth embodiment and the fourth embodiment can also be combined.

According to the fifth embodiment, the confirmation of the live nature is performed by confirming whether the time information during the photographing and the present time are within the predetermined range. Consequently, it is difficult for the user to perform an act of photographing, beforehand, an image to be submitted online during identity verification and live nature confirmation and submitting the image later and an act of processing and submitting an image photographed beforehand. That is, according to the fifth embodiment, there is an effect that it is possible to guarantee that an image of a side surface of the identification card submitted online during the identity verification and the live nature confirmation is an image photographed on the site (live nature). Compared with the first and third embodiments, it is unnecessary to store the photographing guide for the identification card. Therefore, there is an effect that it is possible to reduce the memory areas of the server 110 and the terminal 120.

<Functional Configuration in the Fifth Embodiment>

A functional configuration of the server 110 is explained with reference to FIG. 3. Note that, when the fifth embodiment is not combined with the first embodiment, second embodiment and/or the third embodiment, the selecting unit 313 and the photographing-guide transmitting unit 314 shown in FIG. 3 are unnecessary.

The image receiving unit 315 has a function of receiving, from the terminal 120, images of the identification card of the user added with the time information during the photographing, an image of the face of the user added with the time information during the photographing, and attribute information of the user input by the user.

The authenticating unit 316 has a function of approving the images of the identification card of the user as at least a part of the identity verification for the user when the present time and the time information given to the images of the identification card of the user are within a predetermined range. The authenticating unit 316 has a function of performing the identity verification for the user and the live nature confirmation based on a comparison result of current time, and the time information given to the images of the identification card of the user and the time information given to the image of the face of the user, a comparison result of an image of a face portion included in the received images of the identification card of the user and the received image of the face of the user, and a comparison result of attribute information of the user included in the received images of the identification card of the user and the received attribute information of the user.

A functional configuration of the terminal 120 is explained with reference to FIG. 13. In the fifth embodiment, the position-information measuring unit 327 is unnecessary. Besides, points not particularly referred to may be the same as the points in the fourth embodiment.

The communication unit 322 has a function of transmitting, to the server 110, images of the identification card of the user added with the time information during the photographing, an image of the face of the user added with the time information during the photographing photographed by the photographing unit 324, and the attribute information of the user received by the input unit 321.

The photographing unit 324 has a function of photographing, in response to operation by the user, images of the identification card of the user and an image of the face of the user using the camera included in the terminal 120. The photographing unit 324 has a function of adding the time information during the photographing to the photographed images of the identification card of the user and the photographed image of the face of the user.

<Operation Processing in the Fifth Embodiment>

Figure 15:
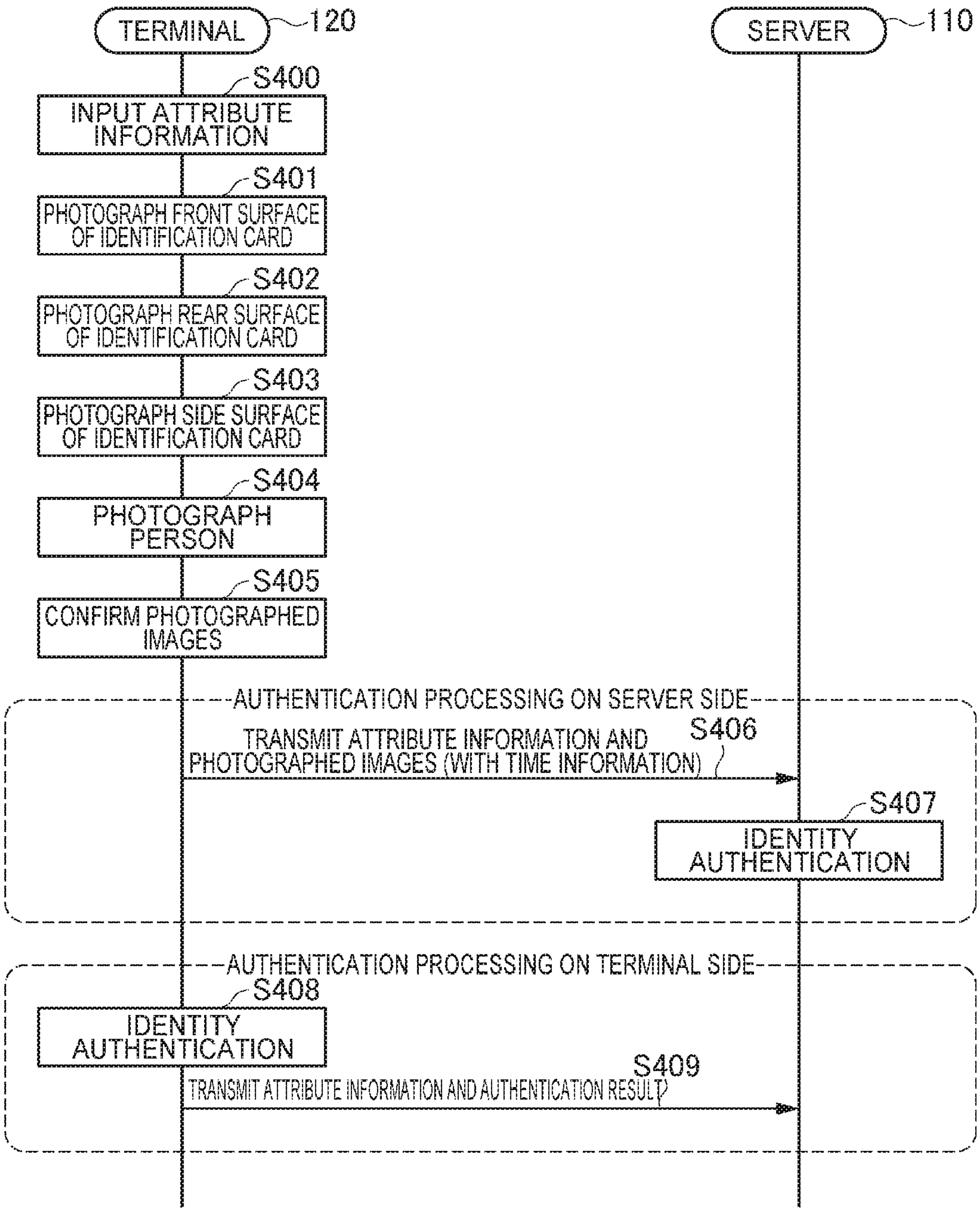
FIG. 15 shows an example of a sequence of processing of a communication system according to a fifth embodiment.

Processing of the communication system 1 according to the fifth embodiment is explained with reference to FIG. 15. FIG. 15 shows an example of a sequence of the processing of the communication system 1 according to the fifth embodiment.

A processing procedure of step S400 is the same as the processing procedure of step S100 in FIG. 5. Therefore, explanation of the processing procedure is omitted.

In step S401, the photographing unit 324 photographs an image of the front surface of the identification card at timing when a shutter button is depressed (or touched) and adds time information during the photographing to the photographed image.

In step S402, the photographing unit 324 photographs an image of the rear surface of the identification card at the timing when the shutter button is depressed (or touched) and adds time information during the photographing to the photographed image.

In step S403, the photographing unit 324 photographs an image of the side surface of the identification card at the timing when the shutter button is depressed (or touched) and adds time information during the photographing to the photographed image.

In step S404, the photographing unit 324 photographs an image of the face of the user at the timing when the shutter button is depressed (or touched) and adds time information during the photographing to the photographed image.

A processing procedure of step S405 is the same as the processing procedure of step S306 in FIG. 14. Therefore, explanation of the processing procedure is omitted.

In step S406, the communication unit 322 transmits, to the server 110, the attribute information of the user input in the processing procedure of step S400, the images of the front surface, the rear surface, and the side surface of the identification card, and the image of the face of the user.

In step S407, the authenticating unit 316 of the server 110 performs the identity verification processing for the user and the live nature confirmation processing using the received attribute information of the user, the received images of the front surface, the rear surface, and the side surface of the identification card, the received image of the face of the user, and the present time.

First, the authenticating unit 316 confirms that time information given to the respective images of the front surface, the rear surface, and the side surface of the identification card of the user and the time information given to the image of the face of the user are included in a predetermined range from the present time.

Subsequently, the authenticating unit 316 compares an image of a face portion included in the images of the identification card and the image of the face of the user and confirms that a result of the comparison satisfies a predetermined coincidence determination standard to confirm that a person photographed in the identification card and the user are the same person.

Subsequently, the authenticating unit 316 compares attribute information of the user included in the images of the identification card and the attribute information of the user input to the terminal 120 by the user to confirm that the attribute information input by the user coincides with a described matter of the identification card.

When all of the items "the time information given to the respective images of the front surface, the rear surface, and the side surface of the identification card of the user and the time information given to the image of the face of the user are included in the predetermined range from the present time", "the image of the face portion included in the images of the identification card of the user and the image of the face of the user satisfy the predetermined coincidence determination standard", and "the attribute information of the user included in the images of the identification card of the user and the received attribute information of the user coincide" are successfully confirmed, the authenticating unit 316 determines that the user is a service applicant himself or herself (identify verification confirmed) and the image is photographed on the site (has live nature).

On the other hand, a processing procedure performed by the authenticating unit 316 when any one of the items is not successfully confirmed is the same as the processing procedure in the first embodiment, second embodiment and/or the third embodiment. Therefore, explanation of the processing procedure is omitted.

When the identity verification processing and the live nature confirmation processing are implemented on the server 110 side, the processing procedures of steps S408 and S409 are omitted. When the identity verification processing and the live nature confirmation processing are implemented on the terminal 120 side, the processing procedures of steps S406 and S407 are omitted.

The identity verification processing and the live nature confirmation processing performed by the authenticating unit 325 of the terminal 120 in step S408 are the same as the identity verification processing and the live nature confirmation processing performed by the authenticating unit 316 of the server 110 in the processing procedure of step S407. Therefore, explanation of the identity verification processing and the live nature confirmation processing is omitted.

A processing procedure of step S409 is the same as the processing procedure of step S112 in FIG. 5. Therefore, explanation of the processing procedure is omitted.

First Example of the Fifth Embodiment

Note that, in the fifth embodiment, in addition to comparing the time information given to the image and the present time, the position information given to the image and the position information indicating the present position of the terminal 120 may be compared to perform the confirmation of the live nature.

For example, the photographing unit 324 of the terminal 120 adds, in addition to the time information, the position information during the photographing to the photographed images of the front surface, the rear surface, and the side surface of the identification card of the user and the photographed image of the face of the user. The communication unit 322 transmits, to the server 110, the position information indicating the present position of the terminal 120, the images of the front surface, the rear surface, and the side surface of the identification card of the user added with the position information and the time during the photographing, and the image of the face of the user added with the position information and the time during the photographing. The image receiving unit 315 of the server 110 receives the images of the identification card of the user added with the position information and the time during the photographing and the image of the face of the user added with the position information and the time during the photographing.

The authenticating unit 316 of the server 110 performs the identity verification for the user and the live nature confirmation based on a comparison result of the position information of the terminal 120, the position information given to the images of the identification card of the user, and the position information given to the image of the face of the user in addition to the comparison of the time information. Specifically, when the position information of the terminal 120, the position information given to the respective images of the front surface, the rear surface, and the side surface of the identification card of the user, and the position information given to the image of the face of the user are within a predetermined range, the authenticating unit 316 may determine that the live nature is successfully confirmed. The predetermined range may be, not as a limitation but as an example, 5 m or less or 10 m or less.

The first example explained above can also be applied when the authenticating unit 325 of the terminal 120 performs the identity verification and the live nature confirmation.

<Note>

(Note 1-1)

A program for causing an information processing device including a display unit to execute:

a step of displaying, on the display unit, an image of a photographing region output by a photographing device;

a step of displaying, in the photographing region displayed on the display unit, a photographing guide indicating a position of an identity verification document in the photographing region and a holding method of the identity verification document, the photographing guide being selected based on a predetermined selection logic; and a step of causing the photographing device to photograph the image of the photographing region.

(Note 1-2)

The program described in note 1-1, wherein the photographing guide includes a photographing guide indicating a position where a finger of a user and the identity verification document are in contact or a photographing guide indicating a direction of a hand of the user and a position of the identity verification document in the hand.

(Note 1-3)

The program described in note 1-1 or 1-2, wherein, in the step of displaying the photographing guide, the photographing guide is selected according to an instruction from another information processing device or selected out of a plurality of variations according to a predetermined selection logic.

(Note 1-4)

The program described in any one of notes 1-1 to 1-3, wherein the photographing guide includes a photographing guide indicating a position of any one of a front surface, a rear surface, and a side surface of the identity verification document in the photographing region.

(Note 1-5)

The program described in any one of notes 1-1 to 1-4, wherein the step of causing the photographing device to photograph the image further includes a step of causing the photographing device to photograph the image when a positional relation between the identity verification document in the photographing region and a part where the identity verification document is held in a body of a user coincides with the photographing guide in a predetermined standard.

(Note 1-6)

An information processing method executed by a second information processing device that communicates with a first information processing device, the information processing method comprising:

transmitting, to the first information processing device, information of a photographing guide indicating a position of an identity verification document in a photographing region and a holding method of the identity verification document, the photographing guide being selected based on a predetermined selection logic;

receiving, from the first information processing device, an image of the identity verification document of a user photographed by the first information processing device; and performing identity verification for the user and live nature confirmation based on a comparison result of the position and the holding method of the identity verification document indicated by the photographing guide and a position and a holding method of the identity verification document in the received moving image of the identity verification document of the user.

(Note 1-7)

An information processing method executed by an information processing device including a display unit, the information processing method comprising:

displaying, on the display unit, an image of a photographing region output by a photographing device;

displaying, in the photographing region displayed on the display unit, a photographing guide indicating a position of an identity verification document in the photographing region and a holding method of the identity verification document, the photographing guide being selected based on a predetermined selection logic; and causing the photographing device to photograph the image of the photographing region.

(Note 1-8)

An information processing device comprising:

a display unit configured to display an image of a photographing region output by a photographing device, the display unit displaying, in the photographing region, a photographing guide indicating a position of an identity verification document in the photographing region and a holding method of the identity verification document, the photographing guide being selected based on a predetermined selection logic; and a photographing unit configured to cause the photographing device to photograph the image of the photographing region.

(Note 1-9)

An information processing device operating as a second information processing device that communicates with a first information processing device, the information processing device comprising:

a transmitting unit configured to transmit, to the first information processing device, information of a photographing guide indicating a position of an identity verification document in a photographing region and a holding method of the identity verification document, the photographing guide being selected based on a predetermined selection logic;

a receiving unit configured to receive, from the first information processing device, an image of the identity verification document of a user photographed by the first information processing device; and an authenticating unit configured to perform identity verification for the user and live nature confirmation based on a comparison result of the position and the holding method of the identity verification document indicated by the photographing guide and a position and a holding method of the identity verification document in the received moving image of the identity verification document of the user.

(Note 1-10)

A program for causing a second information processing device that communicates with a first information processing device to execute:

a step of transmitting, to the first information processing device, information of a photographing guide indicating a position of an identity verification document in a photographing region and a holding method of the identity verification document, the photographing guide being selected based on a predetermined selection logic;

a step of receiving, from the first information processing device, an image of the identity verification document of a user photographed by the first information processing device; and a step of performing identity verification for the user and live nature confirmation based on a comparison result of the position and the holding method of the identity verification document indicated by the photographing guide and a position and a holding method of the identity verification document in the received moving image of the identity verification document of the user.

(Note 2-1)

A program for causing an information processing device including a display unit to execute:

a step of displaying, on the display unit, an image of a photographing region output by a photographing device;

a step of displaying, in the photographing region displayed on the display unit, a photographing guide indicating a photographing method of a face of a user including a position of the face in the photographing region, the photographing guide being selected based on a predetermined selection logic; and a step of causing the photographing device to photograph the image of the photographing region.

(Note 2-2)

The program described in note 2-1, wherein the photographing method of the face further includes a tilt of the face.

(Note 2-3)

The program described in note 2-1 or 2-2, wherein the photographing guide of the face further includes a position of a side surface of an identity verification document.

(Note 2-4)

An information processing method executed by a second information processing device that communicates with a first information processing device, the information processing method comprising:

transmitting, to the first information processing device, information of a photographing guide indicating a position of a face of a user in a photographing region and a photographing method of the face, the photographing guide being selected based on a predetermined selection logic;

receiving, from the first information processing device, an image of the face of the user photographed by the first information processing device; and performing live nature confirmation in an image of the face of the user based on a comparison result of the photographing method of the face indicated by the photographing guide and a photographing method of the face in the received moving image of the face of the user.

(Note 2-5)

The information processing method described in note 2-4, wherein the photographing method of the face further includes a tilt of the face, and in the performing the live nature confirmation, concerning the tilt of the face indicated by the photographing guide of the face, a determination standard for determining whether the photographing method of the face indicated by the photographing guide of the face and the photographing method of the face in the received moving image of the face of the user coincide is changed to be looser as an angle difference between an axis in an up-down direction of the face and an axis in a vertical direction of a photographing screen is larger.

(Note 2-6)

An information processing method executed by an information processing device including a display unit, the information processing method comprising:

displaying, on the display unit, an image of a photographing region output by a photographing device;

displaying, in the photographing region displayed on the display unit, a photographing guide indicating a photographing method of a face of a user including a position of the face in the photographing region, the photographing guide being selected based on a predetermined selection logic; and causing the photographing device to photograph the image of the photographing region.

(Note 2-7)

An information processing device comprising:

a display unit configured to display an image of a photographing region output by a photographing device, the display unit displaying, in the photographing region, a photographing guide indicating a photographing method of a face of a user including a position of the face in the photographing region, the photographing guide being selected based on a predetermined selection logic; and a photographing unit configured to cause the photographing device to photograph the image of the photographing region.

(Note 2-8)

An information processing device operating as a second information processing device that communicates with a first information processing device, the information processing device comprising:

a transmitting unit configured to transmit, to the first information processing device, information of a photographing guide indicating a photographing method of a face of a user including a position of the face in a photographing region, the photographing guide being selected based on a predetermined selection logic;

a receiving unit configured to receive, from the first information processing device, an image of the face of the user photographed by the first information processing device; and an authenticating unit configured to perform live nature confirmation in the image of the face of the user based on a comparison result of the photographing method of the face indicated by the photographing guide and a photographing method of the face in the received moving image of the face of the user.

(Note 2-9)

A program for causing a second information processing device that communicates with a first information processing device to execute:

a step of transmitting, to the first information processing device, information of a photographing guide indicating a photographing method of a face including a position of the face in a photographing region, the photographing guide being selected based on a predetermined selection logic;

a step of receiving, from the first information processing device, an image of the face of the user photographed by the first information processing device; and a step of performing live nature confirmation in the image of the face of the user based on a comparison result of the photographing method of the face indicated by the photographing guide and a photographing method of the face in the received moving image of the face of the user.

(Note 3-1)

A program for causing an information processing device including a display unit to execute:

a step of displaying, on the display unit, an image of a photographing region output by a photographing device;

a step of displaying, on the image of the photographing region, a photographing guide indicating a photographing method of a side surface of an identity verification document according to information indicating a position and a tilt in the photographing region determined based on a predetermined logic; and a step of causing the photographing device to photograph the image of the photographing region.

(Note 3-2)

The program described in note 3-1, wherein, in the step of displaying the photographing guide on the image of the photographing region, the photographing guide is rotated along a surface of a screen, on which the photographing region is displayed, around an axis in a vertical direction with respect to the photographing region and, when predetermined operation is performed, the rotation is stopped to determine the position and the tilt in displaying the photographing guide.

(Note 3-3)

The program described in note 3-1 or 3-2, wherein the photographing guide further includes a photographing guide indicating a positional relation between the identity verification document and a part where the identity verification document is held in a body of a user.

(Note 3-4)

The program described in any one of notes 3-1 to 3-3, wherein, in the step of causing the photographing device to photograph the image, the image of the photographing region is automatically photographed when a side surface of the identity verification document in the photographing region coincides with the photographing guide in a predetermined reference.

(Note 3-5)

The program described in any one of notes 3-1 to 3-4, wherein, in the step of causing the photographing device to photograph the image, information indicating that a side surface of the identity verification document is automatically photographed is transmitted to another information processing device.

(Note 3-6)

An information processing method executed by a second information processing device that communicates with a first information processing device, the information processing method comprising:

receiving, from the first information processing device, information indicating a position and a tilt in displaying a photographing guide indicating a photographing method of a side surface of an identity verification document determined based on a predetermined logic and an image of the side surface of the identity verification document photographed by the first information processing device; and performing live nature confirmation concerning the image of the side surface of the identity verification document based on a comparison result of comparison of the received information indicating the position and the tilt in displaying the photographing guide and a position and a tilt of the side surface of the identity verification document in the received moving image of the side surface of the identity verification document.

(Note 3-7)

The information processing method described in note 3-6, wherein, in the performing the live nature confirmation, when information indicating that the side surface of the identity verification document is automatically photographed is received from the first information processing device, live nature concerning the image of the side surface of the identity verification document is considered to be confirmed without performing comparison of the received information indicating the position and the tilt in displaying the photographing guide and a position and a tilt of the side surface of the identity verification document in the received moving image of the side surface of the identity verification document.

(Note 3-8)

An information processing method performed by an information processing device including a display unit, the information processing method comprising:

displaying, on the display unit, an image of a photographing region output by a photographing device;

displaying, on the image of the photographing region, a photographing guide indicating a photographing method of a side surface of an identity verification document according to information indicating a position and a tilt in the photographing region determined based on a predetermined logic; and causing the photographing device to photograph the image of the photographing region.

(Note 3-9)

An information processing device comprising:

a display unit configured to display an image of a photographing region output by a photographing device, the display unit displaying, on the image of the photographing region, a photographing guide indicating a photographing method of a side surface of an identity verification document according to information indicating a position and a tilt in the photographing region determined based on a predetermined logic; and a photographing unit configured to cause the photographing device to photograph the image of the photographing region.

(Note 3-10)

An information processing method performed by a second information processing device that communicates with a first information processing device, the information processing method comprising:

a step of receiving, from the first information processing device, information indicating a position and a tilt in displaying a photographing guide indicating a photographing method of a side surface of an identity verification document determined based on a predetermined logic and an image of the side surface of the identity verification document photographed by the first information processing device; and a step of performing live nature confirmation concerning the image of the side surface of the identity verification document based on a comparison result of comparison of the received information indicating the position and the tilt in displaying the photographing guide and a position and a tilt of the side surface of the identity verification document in the received moving image of the side surface of the identity verification document.

(Note 3-11)

A program for causing a second information processing device that communicates with a first information processing device to execute:

a step of receiving, from the first information processing device, information indicating a position and a tilt in displaying a photographing guide indicating a photographing method of a side surface of an identity verification document determined based on a predetermined logic and an image of the side surface of the identity verification document photographed by the first information processing device; and a step of performing live nature confirmation concerning the image of the side surface of the identity verification document based on a comparison result of comparison of the received information indicating the position and the tilt in displaying the photographing guide and a position and a tilt of the side surface of the identity verification document in the received moving image of the side surface of the identity verification document.

(Note 4-1)

An information processing method executed by a second information processing device that communicates with a first information processing device, the information processing method comprising:

a receiving step for receiving, from the first information processing device, position information of the first information processing device and an identity verification image of a user added with position information during photographing; and an authenticating step for approving the identity verification image as at least a part of identity authentication of the user when the position information of the first information processing device and position information given to the identity verification image of the user are within a predetermined range.

(Note 4-2)

The information processing method described in note 4-1, wherein the identity verification image includes an image of an identity verification document of the user, the receiving step further includes receiving, from the first information processing device, attribute information of the user input by the user, and the authenticating step further includes performing identity authentication of the user based on a comparison result of attribute information of the user included in the received moving image of the identity verification document of the user and the received attribute information of the user.

(Note 4-3)

The information processing method described in note 4-2, wherein the identity verification image includes an image including a face of the user, and the authenticating step further includes performing the identity authentication of the user based on a comparison result of an image of a face portion included in the received moving image of the identity verification document of the user and the received moving image of the face of the user.

(Note 4-4)

The information processing method described in note 4-3, wherein in the receiving step, the image of the identity verification document of the user further added with time during photographing and the image of the face of the user further added with the time during the photographing are received, and in the authenticating step, the identity authentication of the user is further performed when present time, the time given to the image of the identity verification document of the user, and the time given to the image of the face of the user are within a predetermined range.

(Note 4-5)

A program for causing a first information processing device to execute:

a photographing step for photographing an identity verification image of a user in response to operation by the user and adding position information indicating a position during the photographing to the photographed identity verification image of the user;

an acquiring step for acquiring position information of the first information processing device; and a transmitting step for transmitting, to a second information processing device, the acquired position information of the first information processing device and an image of an identity verification document of the user added with the position information during the photographing.

(Note 4-6)

The program described in note 4-5, wherein in the photographing step, time during the photographing is further added to the photographed identity verification image of the user, and in the transmitting step, the identity verification image of the user further added with the time during the photographing is transmitted to the second information processing device.

(Note 4-7)

An information processing device operating as a second information processing device that communicates with a first information processing device, the information processing device comprising:

a receiving unit configured to receive, from the first information processing device, position information of the first information processing device and an identity verification image of a user added with position information during photographing; and an authenticating unit configured to approve the identity verification image as at least a part of identity authentication of the user when the position information of the first information processing device and position information given to the identity verification image of the user are within a predetermined range.

(Note 4-8)

A program for causing a second information processing device that communicates with a first information processing device to execute:

a receiving step for receiving, from the first information processing device, position information of the first information processing device and an identity verification image of a user added with position information during photographing; and an authenticating step for approving the identity verification image as at least a part of identity authentication of the user when the position information of the first information processing device and position information given to the identity verification image of the user are within a predetermined range.

(Note 4-9)

An information processing device comprising:

a photographing unit configured to photograph an identity verification image of a user in response to operation by the user and add position information indicating a position during the photographing to the photographed identity verification image of the user;

an acquiring unit configured to acquire position information of the information processing device; and a transmitting unit configured to transmit, to another information processing device, the acquired position information of the information processing device and an image of an identity verification document of the user added with the position information during the photographing.

(Note 4-10)

An information processing method executed by a first information processing device, the information processing method comprising:

a photographing step for photographing an identity verification image of a user in response to operation by the user and adding position information indicating a position during the photographing to the photographed identity verification image of the user;

an acquiring step for acquiring position information the first information processing device; and a transmitting step for transmitting, to a second information processing device, the acquired position information of the first information processing device and an image of an identity verification document of the user added with the position information during the photographing.

(Note 5-1)

An information processing method executed by a second information processing device that communicates with a first information processing device, the information processing method comprising:

a receiving step for receiving, from the first information processing device, an identity verification image of a user added with time information during photographing; and an authenticating step for approving the identity verification image as at least a part of identity authentication of the user when time when the identity verification image is received and time information given to the identity verification image of the user are within a predetermined range.

(Note 5-2)

The information processing method described in note 5-1, wherein the identity verification image includes an image of an identity verification document of the user, the receiving step further includes receiving, from the first information processing device, attribute information of the user input by the user, and the authenticating step further includes performing identity authentication of the user based on a comparison result of attribute information of the user included in the received moving image of the identity verification document of the user and the received attribute information of the user.

(Note 5-3)

The information processing method described in note 5-2, wherein the identity verification image includes an image including a face of the user, and the authenticating step further includes performing the identity authentication of the user based on a comparison result of an image of a face portion included in the received moving image of the identity verification document of the user and the received moving image of the face of the user.

(Note 5-4)

The information processing method described in note 5-3, wherein in the receiving step, position information of the first information processing device, the image of the identity verification document of the user further added with position information during photographing, and the image of the face of the user further added with the position information during the photographing are received, and in the authenticating step, the identity authentication of the user is further performed when the position information of the first information processing device, the position information given to the image of the identity verification document of the user, and the position information given to the image of the face of the user are within a predetermined range.

(Note 5-5)

A program for causing a first information processing device to execute:

a photographing step for photographing an identity verification image of a user in response to operation by the user and adding time during the photographing to the photographed identity verification image of the user; and a transmitting step for transmitting, to a second information processing device, the identity verification image of the user added with the time during the photographing.

(Note 5-6)

The program described in note 5-5, further comprising an acquiring step for acquiring position information of the first information processing device, wherein in the photographing step, position information during the photographing is further added to the photographed identity verification image of the user, and in the transmitting step, the acquired position information of the first information processing device and the identity verification image of the user further added with the position information during the photographing are transmitted to the second information processing device.

(Note 5-7)

An information processing device operating as a second information processing device that communicates with a first information processing device, the information processing device comprising:

a receiving unit configured to receive, from the first information processing device, an identity verification image of a user added with time information during photographing; and an authenticating unit configured to approve the identity verification image as at least a part of identity authentication of the user when time when the identity verification image is received and time information given to the identity verification image of the user are within a predetermined range.

(Note 5-8)

A program for causing a second information processing device that communicates with a first information processing device to execute:

a receiving step for receiving, from the first information processing device, an identity verification image of a user added with time information during photographing; and an authenticating step for approving the identity verification image as at least a part of identity authentication of the user when time when the identity verification image is received and time information given to the identity verification image of the user are within a predetermined range.

(Note 5-9)

An information processing device comprising:

a photographing unit configured to photograph an identity verification image of a user in response to operation by the user and add time during the photographing to the photographed identity verification image of the user; and a transmitting unit configured to transmit, to another information processing device, the identity verification image of the user added with the time during the photographing.

(Note 5-10)

An information processing method executed by a first information processing device, the information processing method comprising:

a photographing step for photographing an identity verification image of a user in response to operation by the user and adding time during the photographing to the photographed identity verification image of the user; and a transmitting step for transmitting, to a second information processing device, the identity verification image of the user added with the time during the photographing.

What is claimed is:

1. An information processing method executed by an information processing device including a display device, a processor of the information processing device configured to:

display, on the display device, an image of a photographing region output by a photographing device;

display, in the photographing region displayed on the display device, a photographing guide indicating a position of an identity verification document in the photographing region and a holding method of the identity verification document, the photographing guide being selected based on a predetermined selection logic; and cause the photographing device to photograph the image of the photographing region, wherein the photographing guide includes a photographing guide indicating a position where a finger of a user and the identity verification document are in contact or a photographing guide indicating a direction of a hand of the user and a position of the identity verification document in the hand.

2. The information processing method according to claim 1, wherein, in the displaying the photographing guide, the photographing guide is selected according to an instruction from another information processing device or selected out of a plurality of variations according to a predetermined selection logic.

3. The information processing method according to claim 1, wherein the photographing guide includes a photographing guide indicating a position of any one of a front surface, a rear surface, and a side surface of the identity verification document in the photographing region.

4. The information processing method according to claim 1, wherein the causing the photographing device to photograph the image further includes causing the photographing device to photograph the image when a positional relation between the identity verification document in the photographing region and a part where the identity verification document is held in a body of a user coincides with the photographing guide in a predetermined standard.

5. An information processing device comprising:

a display device configured to display an image of a photographing region, the display device displaying, in the photographing region, a photographing guide indicating a position of an identity verification document in the photographing region and a holding method of the identity verification document, the photographing guide being selected based on a predetermined selection logic; and a photographing device configured to cause the photographing device to photograph the image of the photographing region, wherein the photographing guide includes a photographing guide indicating a position where a finger of a user and the identity verification document are in contact or a photographing guide indicating a direction of a hand of the user and a position of the identity verification document in the hand.

6. The information processing device according to claim 5, wherein, in the displaying the photographing guide, the photographing guide is configured to be selected according to an instruction from another information processing device or selected out of a plurality of variations according to a predetermined selection logic.

7. The information processing device according to claim 5, wherein the photographing guide includes a photographing guide indicating a position of any one of a front surface, a rear surface, and a side surface of the identity verification document in the photographing region.

8. The information processing device according to claim 5, wherein the causing the photographing device to photograph the image further includes causing the photographing device to photograph the image when a positional relation between the identity verification document in the photographing region and a part where the identity verification document is held in a body of a user coincides with the photographing guide in a predetermined standard.

9. An information processing device operating as a second information processing device that communicates with a first information processing device, a processor of the information processing device configured to:

transmit, to the first information processing device, information of a photographing guide indicating a position of an identity verification document in a photographing region and a holding method of the identity verification document, the photographing guide being selected based on a predetermined selection logic;

receive, from the first information processing device, an image of the identity verification document of a user photographed by the first information processing device; and perform identity verification for the user and live nature confirmation based on a comparison result of the position and the holding method of the identity verification document indicated by the photographing guide and a position and a holding method of the identity verification document in the received image of the identity verification document of the user, wherein the photographing guide includes a photographing guide indicating a position where a finger of a user and the identity verification document are in contact or a photographing guide indicating a direction of a hand of the user and a position of the identity verification document in the hand.

10. The information processing device according to claim 9, wherein the photographing guide is configured to be selected according to an instruction from another information processing device or selected out of a plurality of variations according to a predetermined selection logic.

11. The information processing device according to claim 9, wherein the photographing guide includes a photographing guide indicating a position of any one of a front surface, a rear surface, and a side surface of the identity verification document in the photographing region.

* * * * *

UNITED STATES PATENT AND TRADEMARK OFFICE

CERTIFICATE OF CORRECTION

PATENT NO. : 10,785,407 B2
APPLICATION NO. : 16/527166
DATED : September 22, 2020
INVENTOR(S) : Lertsumruaypun et al.

It is certified that error appears in the above-identified patent and that said Letters Patent is hereby corrected as shown below:

In the Claims

In Column 48, Lines 21-22 (Claim 5), delete “to cause the photographing device”.

Signed and Sealed this
First Day of December, 2020

Andrei Iancu
*Director of the United States Patent and Trademark Office*